US011910138B2

(12) United States Patent
Naderyan et al.

(10) Patent No.: US 11,910,138 B2
(45) Date of Patent: *Feb. 20, 2024

(54) SUB-MINIATURE MICROPHONE

(71) Applicant: Knowles Electronics, LLC, Itasca, IL (US)

(72) Inventors: Vahid Naderyan, Itasca, IL (US); Michael Pedersen, Long Grove, IL (US); Peter V. Loeppert, Durand, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,773

(22) Filed: Oct. 15, 2022

(65) Prior Publication Data

US 2023/0035383 A1 Feb. 2, 2023

Related U.S. Application Data

(63) Continuation of application No. 17/037,959, filed on Sep. 30, 2020, now Pat. No. 11,509,980.

(Continued)

(51) Int. Cl.
*H04R 1/02* (2006.01)

(52) U.S. Cl.
CPC ......... *H04R 1/02* (2013.01); *H04R 2201/003* (2013.01)

(58) Field of Classification Search
CPC .... H04R 19/04; H04R 19/005; H04R 31/006; H04R 2201/003; H04R 31/00; H04R 1/00;

(Continued)

(56) References Cited

U.S. PATENT DOCUMENTS 5,575,310 A * 11/1996 Kamen ..................... G01F 1/34 137/565.34
11,509,980 B2 * 11/2022 Naderyan ................ H04R 1/02

(Continued)

OTHER PUBLICATIONS

Thermal boundary layer limitation on the performance of micromachined microphone by Kuntzman (Year: 2018).*

(Continued)

*Primary Examiner* — Carolyn R Edwards
*Assistant Examiner* — Julie X Dang
(74) *Attorney, Agent, or Firm* — Loppnow & Chapa; Matthew C. Loppnow

(57) ABSTRACT

A microphone assembly can include a microelectromechanical systems (MEMS) transducer comprising a transducer substrate, a diaphragm oriented substantially parallel to the transducer substrate and spaced apart from the transducer substrate to form a gap, and a counter electrode coupled to the transducer substrate, the counter electrode positioned between the diaphragm and the transducer substrate. The MEMS transducer can generate a signal representative of a change in capacitance between the counter electrode and the diaphragm. A back volume of the MEMS transducer can be an enclosed volume positioned between the transducer substrate and the diaphragm. The microphone assembly can include an integrated circuit that receives the signal, wherein every point within the back volume is less than a thermal boundary layer thickness from a nearest solid surface at an upper limit of an audio frequency band that the integrated circuit is monitoring.

9 Claims, 19 Drawing Sheets

Related U.S. Application Data

(60) Provisional application No. 62/923,198, filed on Oct. 18, 2019.

(58) Field of Classification Search
CPC .. H04R 1/02; H04R 1/026; H04R 1/04; B81B 3/0086; B81B 2203/0127; B81B 2201/0257; B81B 7/0061; B81B 3/0051; B81B 2203/0307; B81B 2203/0361; B81C 1/00158
See application file for complete search history.

(56) References Cited

U.S. PATENT DOCUMENTS

| | | | | |
|---|---|---|---|---|
| 2012/0087521 | A1* | 4/2012 | Delaus | H04R 19/005<br>381/174 |
| 2012/0328132 | A1* | 12/2012 | Wang | H04R 19/04<br>381/174 |
| 2013/0094675 | A1* | 4/2013 | Je | H04R 31/00<br>381/174 |
| 2014/0003633 | A1* | 1/2014 | Liu | H04R 23/00<br>381/174 |
| 2019/0356974 | A1* | 11/2019 | Loeppert | H04R 19/04 |

OTHER PUBLICATIONS

Thermal boundary layer effects on the acoustical impedance of enclosures and consequences for acoustical sensing devices by Thompson (Year: 2008).*

* cited by examiner

SUB-MINIATURE MICROPHONE

FIELD OF THE DISCLOSURE

The present disclosure relates to microphone assemblies that include microelectromechanical systems (MEMS).

BACKGROUND

Microphone assemblies that include microelectromechanical systems (MEMS) acoustic transducers convert acoustic energy into an electrical signal. The microphone assemblies may be employed in mobile communication devices, laptop computers, and appliances, among other devices and machinery. An important parameter for a microphone assembly is the acoustic signal-to-noise ratio (SNR), which compares the desired signal level (e.g., the signal amplitude due to acoustic disturbances captured by the microphone assembly) to the level of background noise. In microphone assemblies that include MEMS acoustic transducers, SNR often limits the smallest dimensions that can be achieved and the overall package size of the microphone assembly.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. Various embodiments are described in more detail below in connection with the appended drawings.

Figure 2:
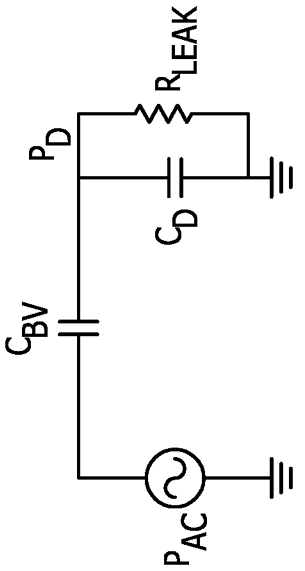
FIG. 2 is a signal lumped element model for the MEMS microphone of FIG. 1, according to an illustrative embodiment.

In the following detailed description, various embodiments are described with reference to the appended drawings. The skilled person will understand that the accompanying drawings are schematic and simplified for clarity and therefore merely show details which are essential to the understanding of the disclosure, while other details have been left out. Like reference numerals refer to like elements or components throughout. Like elements or components will therefore not necessarily be described in detail with respect to each figure.

DETAILED DESCRIPTION

A first aspect of the present disclosure relates to a MEMS transducer. The MEMS transducer includes a transducer substrate, a counter electrode, and a diaphragm. The counter electrode is coupled to the transducer substrate. The diaphragm is oriented substantially parallel to the counter electrode and is spaced apart from the counter electrode to form a gap. A back volume of the MEMS transducer is an enclosed volume positioned between the counter electrode and the diaphragm. A height of the gap between the counter electrode and the diaphragm is less than two times the thermal boundary layer thickness within the back volume at an upper limit of the audio frequency band of the MEMS transducer.

A second aspect of the present disclosure relates to a MEMS device. The MEMS device includes an integrated circuit and a MEMS transducer formed on the integrated circuit. The MEMS transducer includes a counter electrode and a diaphragm oriented substantially parallel to the counter electrode and spaced apart from the counter electrode to form a gap. A back volume of the MEMS transducer is an enclosed volume positioned between the counter electrode and the diaphragm. A height of the gap between the counter electrode and the diaphragm is less than two times the thermal boundary layer thickness within the back volume at an upper limit of the audio frequency band of the MEMS transducer.

A third aspect of the present disclosure relates to a MEMS transducer. The MEMS transducer includes a transducer substrate, a counter electrode coupled to the transducer substrate, and a diaphragm oriented substantially parallel to the counter electrode and spaced apart from the counter electrode. A back volume of the MEMS transducer is an enclosed volume positioned between the diaphragm and the transducer substrate.

A fourth aspect of the present disclosure relates to a microphone assembly. The microphone assembly includes a transducer substrate and a diaphragm spaced apart from the transducer substrate to form a back volume. The back volume has a surface boundary comprising at least the diaphragm and the transducer substrate. Any location within the back volume is within a single thermal boundary layer thickness from the surface boundary at an upper limit of the audio frequency band.

The description is illustrative only and is not intended to be in any way limiting. In addition to the illustrative aspects, embodiments, and features described above, further aspects, embodiments, and features will become apparent by reference to the following drawings and the detailed description.

Pressure microphones typically include a diaphragm that responds to the pressure difference on either side of it. In an omnidirectional microphone 10, see FIG. 1, one side of the diaphragm 12 is coupled to an outside environment 14 and the pressure on that side of the diaphragm 12 is the sum of atmospheric pressure ($P_{atm}$) and the desired acoustic signal ($P_{ac}$). The pressure on the other side of the diaphragm 12 is provided by a back volume 16 which is acoustically isolated from the outside environment 14 yet maintains atmospheric pressure in it through a small acoustic leak 15.

Figure 1:
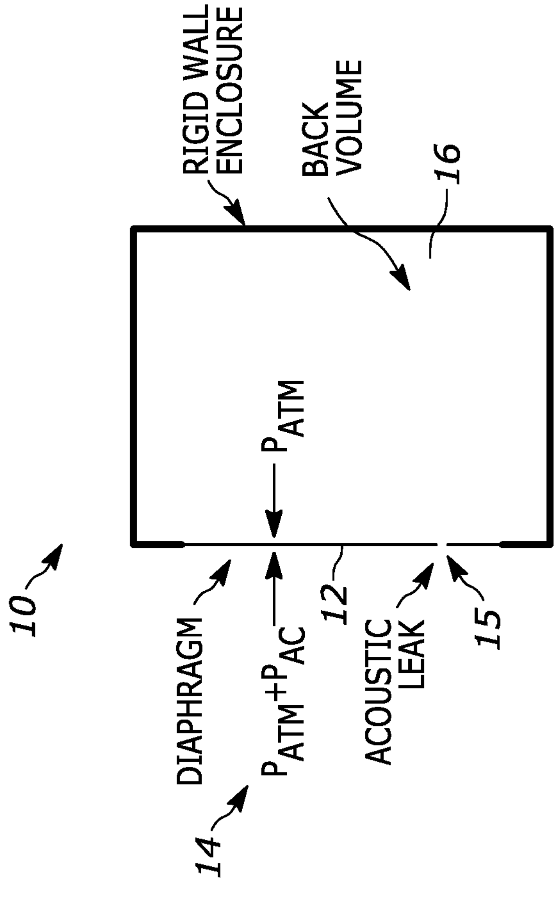
FIG. 1 is a side cross-sectional view of a MEMS microphone, according to an illustrative embodiment.

A small signal lumped element model for the omnidirectional microphone 10 of FIG. 1 is shown in FIG. 2. The compliance of the diaphragm 12 and the back volume 16 are represented by $C_D$ and $C_{BV}$, respectively. The resistance of the acoustic leak 15 is represented by $R_{Leak}$. The pressure across the diaphragm 12, $P_D$, causes the diaphragm 12 to move. Notice that the atmospheric pressure, which is present on both sides of the diaphragm 12, is no factor in the diaphragm motion and is not included in this small signal model. Notice also, that when the back volume compliance ($C_{BV}$) is large compared to that of the diaphragm ($C_D$), most of the acoustic pressure is present across the diaphragm 12. If the back volume compliance ($C_{BV}$) is small compared to that of the diaphragm ($C_D$), very little of the acoustic pressure is present across the diaphragm 12. The acoustic leak resistance ($R_{Leak}$) acts in conjunction with the parallel combination of the back volume compliance ($C_{BV}$) and the diaphragm compliance ($C_D$) to form a high pass filter. Thus only acoustic pressure signals above a certain frequency will be present across the diaphragm 12.

The acoustic leak, being a real resistance, generates thermal noise. This noise appears as a noise pressure across the diaphragm 12. But the parallel combination of the back volume compliance ($C_{BV}$) and the diaphragm compliance ($C_D$) limits the noise to low frequencies so that when the noise is integrated over the audio frequency range (the noise is band limited so this is equivalent to integrating from zero to infinity), the result is the well known quantity kT/C where k is Boltzmann's constant, T is absolute temperature, and C is the parallel combination of the two compliances ($C_D$ and $C_{BV}$). Thus for a particular low frequency cut-off, the noise due to the acoustic leak generally increases with smaller microphones. The only option to reduce this noise is to lower the cut-off frequency for smaller microphones. Traditional A-Weighting depreciates the significance of the low frequency leak noise even for very small microphones with sufficiently low cut-off frequencies.

This has been the traditional view of microphones above a certain size. However, for small microphones another factor becomes significant. As pointed out by Kuntzman et al. (hereafter "Kuntzman"), "Thermal Boundary Layer Limitations on the Performance of Micromachined Microphones," J. Acoust. Soc. Am. 144(5), 2018, which is incorporated by reference herein, the thermal boundary layer is that factor. Kuntzman discloses the effects of acoustic compression and expansion of air within the back volume of a microphone assembly as a function of the dimensions of the microphone assembly enclosure (e.g., as a function of the back volume of the microphone assembly). Kuntzman states: "for cases in which the thermal boundary layer becomes sufficiently large relative to the enclosure dimensions, which occurs for small enclosures and at low frequencies, compression and expansion of the air within the enclosure transitions from adiabatic to isothermal and a correction to the adiabatic cavity impedance becomes necessary. Heat transfer at the enclosure walls dissipates energy from the system and results in acoustic damping, which contributes thermal-acoustic noise according to the fluctuation-dissipation theorem." Kuntzman further states: "the acoustic damping resulting from thermal relaxation losses in the enclosure can be a significant noise contributor, particularly for small enclosure sizes for which the losses are most prominent." Stated generally, Kuntzman teaches that it is desirable to increase the back volume for a microphone assembly to reduce thermal-acoustic noise.

The effects of thermal-acoustic noise are most significant at low operating frequencies, as indicated by Thompson et al. (hereafter "Thompson"), "Thermal Boundary Layer Effects on the Acoustical Impedance of Enclosures and Consequences for Acoustical Sensing Devices," J. Acoust. Soc. Am. 123(3), 2008, which is incorporated by reference herein. Thompson states: "the change in microphone sensitivity from thermal effects is caused by the change in the compliance of the [microphone] enclosure at low frequencies . . . the thermal resistance could possibly affect the internal noise of the microphone if the noise from this resistance were comparable to or greater than the other thermal noise sources in the microphone." The thermal-acoustic noise contribution is expected to be greatest for MEMS transducers with small enclosure volumes and low operating frequencies, where the distances between solid surfaces are on the order of the thickness of the thermal boundary layer within the back volume (which increases with decreasing operating frequency). The thermal boundary layer thickness may be determined approximately as $$\delta_t = \sqrt{\left(\frac{2\kappa}{\omega\rho_0 C_p}\right)}$$

where ω is the operating angular frequency of the microphone, and where κ is the thermal conductivity, $\rho_0$ is the density, and $C_p$ is the specific heat at constant pressure of the gas inside the microphone assembly (e.g., within the back volume of the microphone assembly). The relationship above confirms the dependency between the thermal boundary layer thickness and the operating frequency of the microphone.

The materials that comprise a microphone, metals and plastics for instance, all have much larger thermal capacities than air. Thus at each surface of the back volume, there is heat exchange with the boundary materials and these surfaces are essentially isothermal. The heat exchange is frequency dependent and contributes to the impedance of the back volume. In essence, when the air in the back volume is compressed, its temperature rises. At a given frequency, the portion of the air within a diffusion length of a boundary gives up this heat to the boundary material. When the air in the back volume rarifies, the temperature of the air drops but the portion of the air within a diffusion length of a boundary gains heat from the boundary material.

Figure 3:
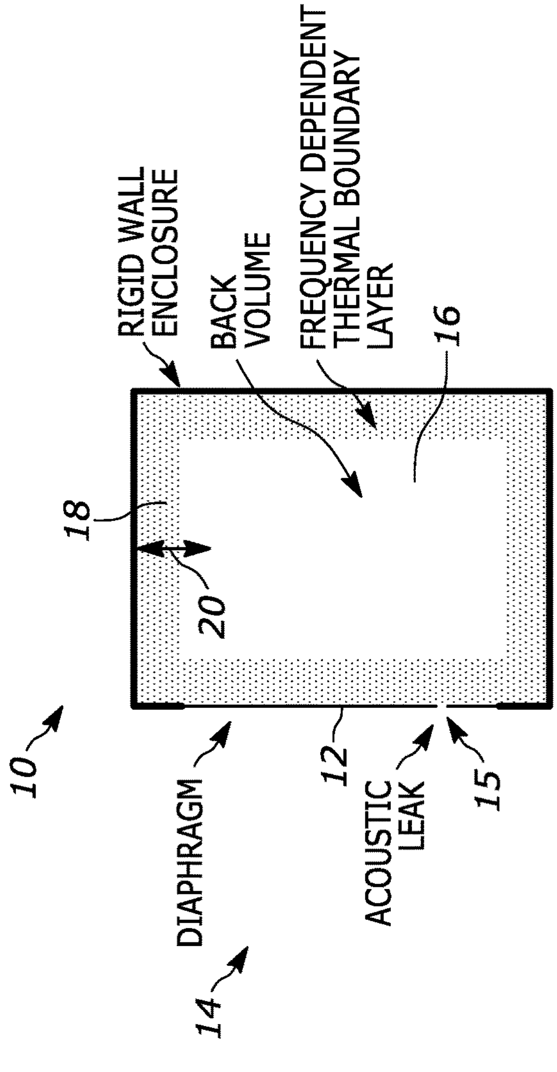
FIG. 3 is a side cross-sectional view of a MEMS microphone that shows a thermal boundary layer within a back volume of the MEMS microphone, according to an illustrative embodiment.
Figure 4:
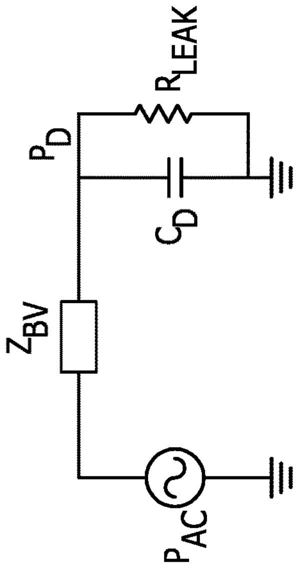
FIG. 4 is a signal lumped element model for the MEMS microphone of FIG. 3, according to an illustrative embodiment.

FIG. 3 depicts the thermal boundary layer 18 for the omnidirectional microphone 10 of FIG. 1. In this figure, the thermal boundary layer 18 is shaded to depict how the thickness 20 of the thermal boundary layer 18 changes with frequency. Darker shading corresponds to the thickness 20 at higher frequency. Thus, at high frequencies, the thermal boundary layer 18 is quite thin while at low frequencies, the thermal boundary layer 18 is thicker. The impact of the thermal boundary layer 18 on the model is shown in FIG. 4. The compliance of the back volume is now replaced with a complex impedance. The real part of the complex impedance depends on frequency and microphone size and thus a noise contribution is made to the pressure across the diaphragm. The analysis of this noise effect is complex but addressed in Kuntzman. In essence, as the microphone gets smaller, the thermal boundary layer expands to consume more of the total back volume and when integrated, the total noise effect on the pressure across the diaphragm goes up as the microphone size goes down. This is another expected kT/C effect. The inventors have found an unexpected size region that runs contrary to the conventional wisdom. At very small sizes, where the thermal boundary layer consumes the entire back volume, and particularly for frequencies below audio (<20 kHz) where there is a significant fraction of thermal boundary layer volume within the total back volume, the trend of increasing noise reverses. This is because the noise band now exceeds the audio frequency band. If we integrate the noise from zero to infinite frequency, we still get kT/C which increases with smaller size. However, we only need to integrate over the audio frequency band which results in a smaller fraction of the total noise power as size goes down.

This entire discussion has been agnostic with regards to the transduction method for extracting an electrical signal from the diaphragm motion. This transduction method could be any of the known methods such as optical, piezoresistive, piezoelectric, or capacitive.

In general, disclosed herein are systems and devices for providing high acoustic signal-to-noise ratio (SNR) performance for a MEMS acoustic transducer in a sub-miniature microphone assembly. In particular, disclosed herein are MEMS acoustic transducers where the distance between any point within the back volume and the nearest solid surface to that point is less than a single thermal boundary layer thickness at an upper limit of the audio frequency band for the MEMS transducers. Because the thermal boundary layer thickness increases with decreasing frequency (as described above), this limit ensures that the distance between any point within the back volume and the nearest solid surface is less than a single thermal boundary layer thickness over a majority of the audio frequency band for the MEMS transducers. As used hereafter, the upper limit is an upper frequency of the audio band in which audio signals are detected by the MEMS transducer. For example, the upper limit may be an upper range of the frequency band that the integrated circuit is monitoring for the audio signal (e.g., 20 kHz).

In various illustrative embodiments, the MEMS acoustic transducer includes a transducer substrate, a stationary counter electrode coupled to the transducer substrate, and a moveable diaphragm. The diaphragm is oriented substantially parallel to the counter electrode and is spaced apart from the counter electrode to form a gap (e.g., a spacing between the counter electrode and the diaphragm). The counter electrode is a solid, unperforated structure such that a back volume of the MEMS transducer is an enclosed volume positioned between the counter electrode and the diaphragm. In other words, the entire back volume is positioned in a region between two points, a first point being on a surface of the counter electrode and a second point being on a surface of the diaphragm, along a linear line extending in a substantially perpendicular orientation relative to the surface of the counter electrode. As used herein, the phrase "enclosed volume" refers to a volume that is substantially enclosed but may not be fully enclosed. For example, the enclosed volume may refer to a volume that is fluidly connected with an environment surrounding the MEMS transducer via a pierce or opening in the diaphragm. The back volume does not include any additional volume on an opposite side of the counter electrode (e.g., an interior cavity formed between the MEMS transducer and an outer shell housing, cover, etc. of the microphone assembly). In some embodiments, the counter electrode may form a back plate for the MEMS transducer. However, to avoid confusion with a traditional back plate, which is perforated, we will use the term counter electrode throughout this disclosure to emphasize that the electrode may be a solid, unperforated structure. The dimensions between adjacent solid surfaces within the back volume (e.g., a distance between the diaphragm and the counter electrode parallel to a central axis of the MEMS transducer, etc.) are less than two times a thermal boundary layer thickness over a majority of the audio frequency band of the MEMS transducer. In particular, a size of the gap, between the counter electrode and the diaphragm (e.g., axially), is less than two times the thermal boundary layer thickness within the back volume across a majority of an audio frequency band of the MEMS transducer (e.g., 20 Hz to 20 kHz).

In some embodiments, an entire surface (e.g., lower surface) of the counter electrode is coupled to the transducer substrate, which, advantageously increases the overall stiffness of the counter electrode (e.g., such that the stiffness of the counter electrode is much greater than a stiffness of the air within the volume between the counter electrode and the diaphragm). Because the counter electrode is a solid structure that does not permit airflow therethrough, the MEMS transducer may be formed (e.g., or mounted) onto other components of the microphone assembly. For example, the MEMS transducer may be formed onto an integrated circuit for the microphone assembly, which may further decrease the overall size (e.g., package size, footprint, etc.) of the microphone assembly. The details of the general depiction provided above will be more fully explained by reference to FIGS. 5-23.

Figure 5:
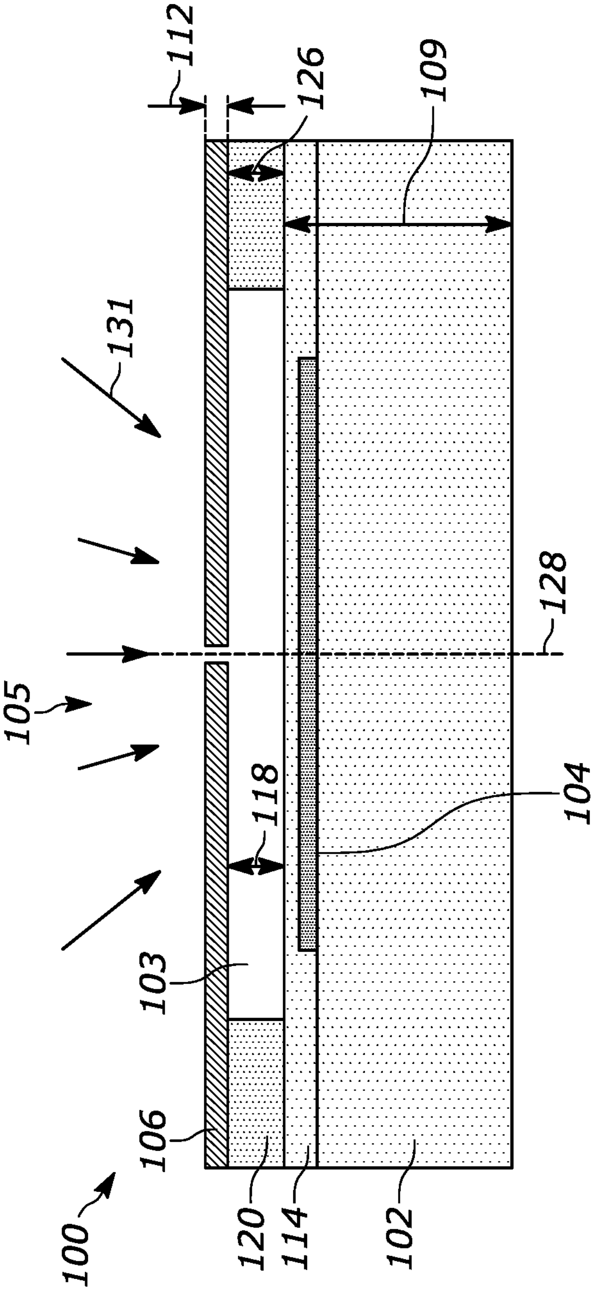
FIG. 5 is a side cross-sectional view of a sub-miniature MEMS acoustic transducer, according to an illustrative embodiment.
Figure 6:
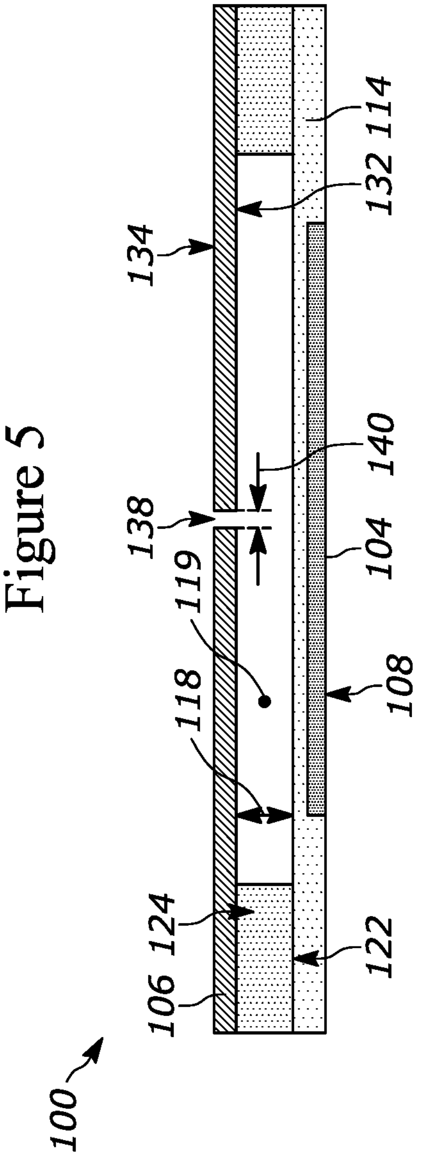
FIG. 6 is a reproduction of FIG. 5 near a back volume for the sub-miniature MEMS acoustic transducer.

FIGS. 5-6 shows a side cross-sectional view of a sub-miniature MEMS transducer 100 for a sub-miniature microphone assembly. The sub-miniature MEMS transducer 100 is configured as a capacitive acoustic transducer structured to generate an electrical signal in response to acoustic disturbances incident on the sub-miniature MEMS transducer 100. In other embodiments, the MEMS transducer 100 may be another type of transducer, such as a piezoelectric transducer, a piezoresistive transducer, or an optical transducer. The sub-miniature MEMS transducer 100 includes a transducer substrate 102, a stationary counter electrode 104, and a movable diaphragm 106. The transducer substrate 102 supports the counter electrode 104 and the diaphragm 106. As shown in FIG. 5, the counter electrode 104 is coupled directly to the transducer substrate 102 along an entire lower surface 108 of the counter electrode 104. The transducer substrate 102 is large relative to the diaphragm 106 (and the counter electrode 104) to ensure that the counter electrode 104 is rigidly supported. In particular, a combined thickness 109 of the transducer substrate 102 and counter electrode 104 is an order of magnitude greater than a thickness 112 of the diaphragm 106. In other embodiments, the relative thickness between the transducer substrate 102 and the diaphragm 106 may be different.

The counter electrode 104 is deposited directly onto a first surface (e.g., an upper surface as shown in FIG. 5) of the transducer substrate 102. In some embodiments, as shown in FIG. 5, the counter electrode 104 is deposited onto or otherwise connected to an insulator 114. The insulator 114 may be made from silicon nitride or another dielectric material. The counter electrode 104 may be made from polycrystalline silicon or another suitable conductor. As shown in FIG. 5, the counter electrode 104 is "sandwiched" or otherwise disposed between the transducer substrate 102 and the insulator 114. The counter electrode 104 is at least partially embedded within a lower surface of the insulator 114 and is directly coupled to the transducer substrate 102. In other embodiments, the position of the counter electrode 104 may be different (e.g., the counter electrode 104 may be embedded within or formed onto an upper surface of the insulator 114). In yet other embodiments, the counter electrode 104 may extend to an outer perimeter of the volume between the counter electrode 104 and the diaphragm 106 (e.g., the diameter of the counter electrode 104 may be approximately the same as the diameter of the diaphragm 106.

The diaphragm 106 is oriented parallel (or substantially parallel) to the counter electrode 104 and is spaced apart from the counter electrode 104 to form a gap. In various illustrative embodiments, the gap represents a height 118 of a cylindrically-shaped cavity (e.g., a cylindrically-shaped volume between the counter electrode 104 and the diaphragm 106). The volume between the counter electrode 104 and the diaphragm 106 forms an entire back volume 103 for the microphone assembly as will be further described. The diaphragm 106 is indirectly coupled to the counter electrode 104 by an intermediate layer 120 (e.g., an intervening layer) and is spaced apart from the counter electrode 104 by at least the intermediate layer 120. In other words, the diaphragm 106 is connected to the counter electrode 104 by the intermediate layer 120. A first side 122 of the intermediate layer 120 is coupled to the insulator 114, which, in turn, is coupled to counter electrode 104. A second side 124 of the intermediate layer 120 is coupled to the diaphragm 106 along at least a portion of the perimeter of the diaphragm 106. A height 126 of the intermediate layer 120 (e.g., an axial height of the intermediate layer 120 parallel to a central axis 128 of the sub-miniature MEMS transducer 100), plus a height/thickness of the insulator 114 between the counter electrode 104 and the intermediate layer 120, is approximately equal to a distance between the diaphragm 106 and the counter electrode 104 (e.g., the height 118). In other embodiments, the distance between the diaphragm 106 and the counter electrode 104 is approximately equal to the height of the intermediate layer 120. In various illustrative embodiments, the intermediate layer 120 includes a sacrificial layer (e.g., an oxide layer, a phosphosilicate glass (PSG) layer, a nitride layer, or any other suitable material) that is deposited or otherwise formed onto the counter electrode 104. In some embodiments, the intermediate layer 120 may be made from silicon oxide or other materials that can be etched without affecting the transducer substrate 102, the counter electrode 104, or the diaphragm 106.

The diaphragm 106 is made from polycrystalline silicon or another conductive material. In other embodiments, the diaphragm 106 includes both an insulating layer and a conductive layer. As shown in FIG. 6, a first side 132 of the diaphragm 106 faces the back volume 103. A second side 134 of the diaphragm 1036, opposing the first side 132, faces toward a front volume 105 for the microphone assembly. Sound energy 131 (e.g., sound waves, acoustic disturbances, etc.) incident on the second side 134 diaphragm 106 from the front volume 105 causes the diaphragm 106 to move toward or away from the counter electrode 104. The change in distance between the counter electrode 104 and the diaphragm 106 (e.g., the change in the height 118) results in a corresponding change in capacitance. An electrical signal representative of the change in capacitance may be generated and transmitted to other portions of the microphone assembly, such as an integrated circuit (not shown), for processing.

The counter electrode 104 is a solid, unperforated structure, such that the volume between the counter electrode 104 and the diaphragm 106 forms an entire back volume 103 for the microphone assembly. In contrast, for MEMS transducers that include a perforated counter electrode (e.g., a back plate with multiple through-hole openings), the back volume includes both the volume between the counter electrode 104 and the diaphragm 106 as well as any additional fluid (e.g., air) volume on an opposing side of the counter electrode 104 to which the space between the counter electrode 104 and the diaphragm 106 is fluidly connected.

Figure 7:
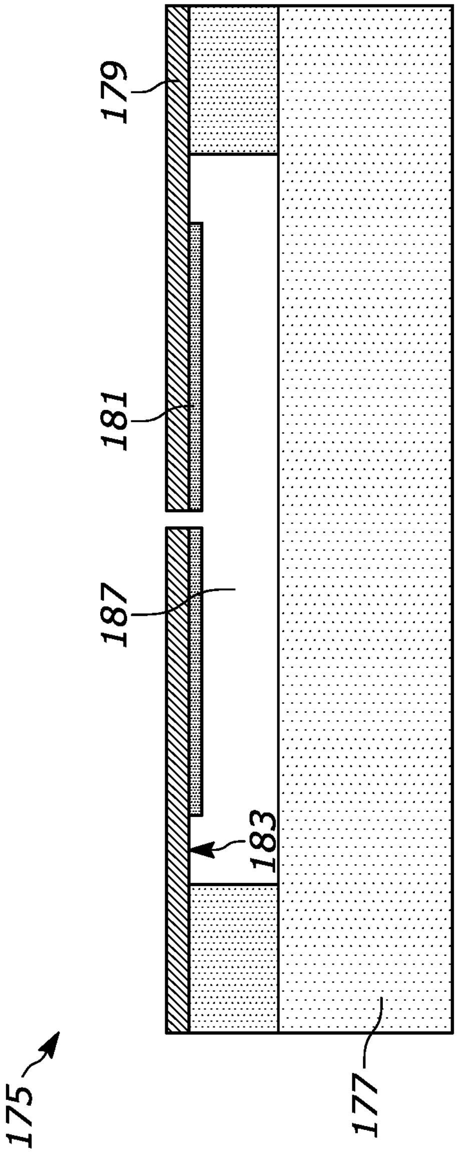
FIG. 7 is a side cross-sectional view of a sub-miniature piezoelectric MEMS transducer, according to an illustrative embodiment.
Figure 8:
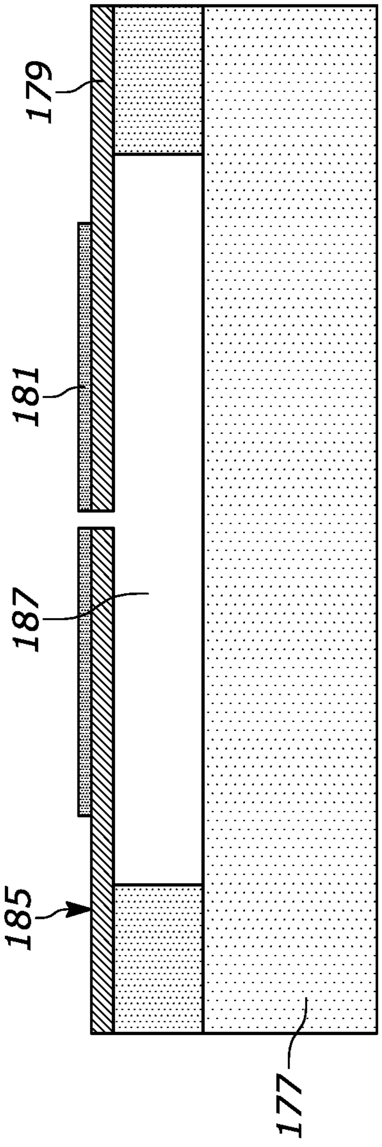
FIG. 8 is a side cross-sectional view of a sub-miniature piezoelectric MEMS transducer, according to another illustrative embodiment.

Embodiments of the present disclosure may also include other types of MEMS transducers. For example, the sub-miniature MEMS transducer may be a piezoelectric transducer, a piezoresistive transducer, or an optical transducer. FIG. 7 shows an embodiment of a sub-miniature piezoelectric MEMS transducer 175. The sub-miniature piezoelectric MEMS transducer 175 includes a transducer substrate 177 and a diaphragm 179 coupled to the transducer substrate 177 and spaced apart from the transducer substrate 177. The sub-miniature piezoelectric MEMS transducer 175 also includes a piezoelectric layer 181 connected to the diaphragm 179. As shown in FIG. 7, the piezoelectric layer 181 may be connected (e.g., deposited onto or otherwise coupled) to a lower surface 183 of the diaphragm 179. In other embodiments, as shown in FIG. 8, the piezoelectric layer 181 may be connected to an upper surface 185 of the diaphragm 179. In either case, the volume between the transducer substrate 177 and the diaphragm 179 forms an entire back volume 187 for the sub-miniature piezoelectric MEMS transducer 175.

Figure 9:
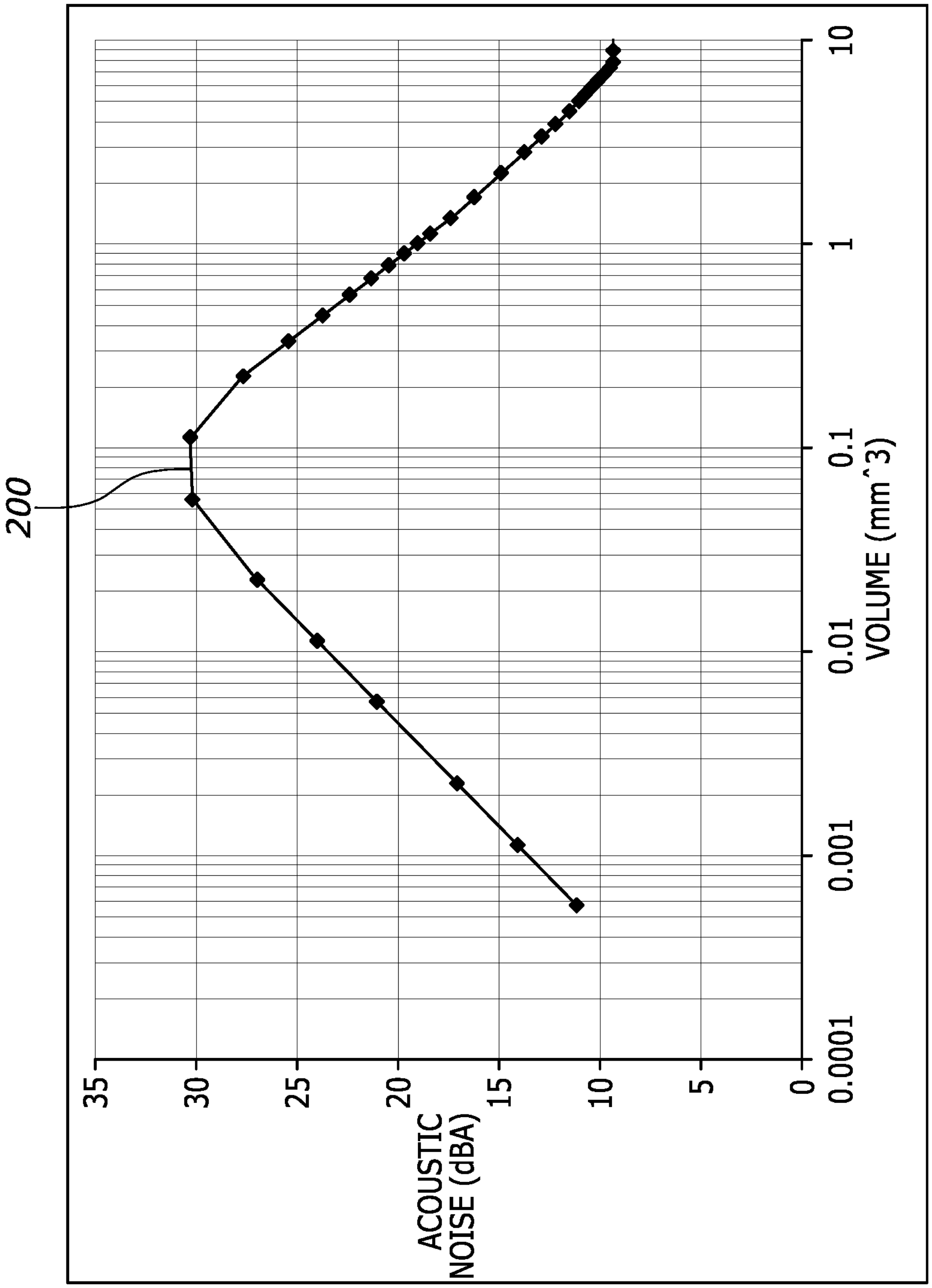
FIG. 9 is a graph of acoustic noise as a function of back volume for a MEMS transducer, according to an illustrative embodiment.

FIG. 9 shows a plot of the A-weighted acoustic noise 200 in the audio frequency band (e.g., range) of 20 Hz to 20 kHz (hereafter "acoustic noise") of a MEMS transducer as a function of the size of the back volume of the MEMS transducer. In particular, FIG. 9 shows the simulated relationship between the acoustic noise 200 and the back volume for a MEMS transducer with a counter electrode and diaphragm of fixed size (e.g., for a diaphragm with fixed diameter). In the simulation, the back volume 103 (see also FIG. 5) was varied within a range between approximately 0.0006 $mm^3$ and 10 $mm^3$ by changing the size of the gap (e.g., height 118) between 0.5 μm and 8 mm. As shown in FIG. 9, the acoustic noise 200 increases with decreasing back volume (e.g., height 118) within a range between approximately 9 $mm^3$ and 0.1 $mm^3$. The trend in acoustic noise 200 between approximately 9 $mm^3$ and 0.1 $mm^3$ is consistent with the discussion provided in both Kuntzman and Thompson, which teach that the acoustic noise increases as the size of the back volume 103 decreases. Surprisingly, a reversal in the trend is observed (for the simulated diaphragm diameter) below a back volume 103 of approximately 0.1 $mm^3$ (in the size range of the sub-miniature MEMS transducer). As shown in FIG. 9, at a back volume 103 of approximately 0.0006 $mm^3$, the acoustic noise 200 has returned to levels that are approximately equal to those achieved at 4 $mm^3$ (e.g., a reduction in total back volume 103 by a factor of approximately 7500).

Figure 10:
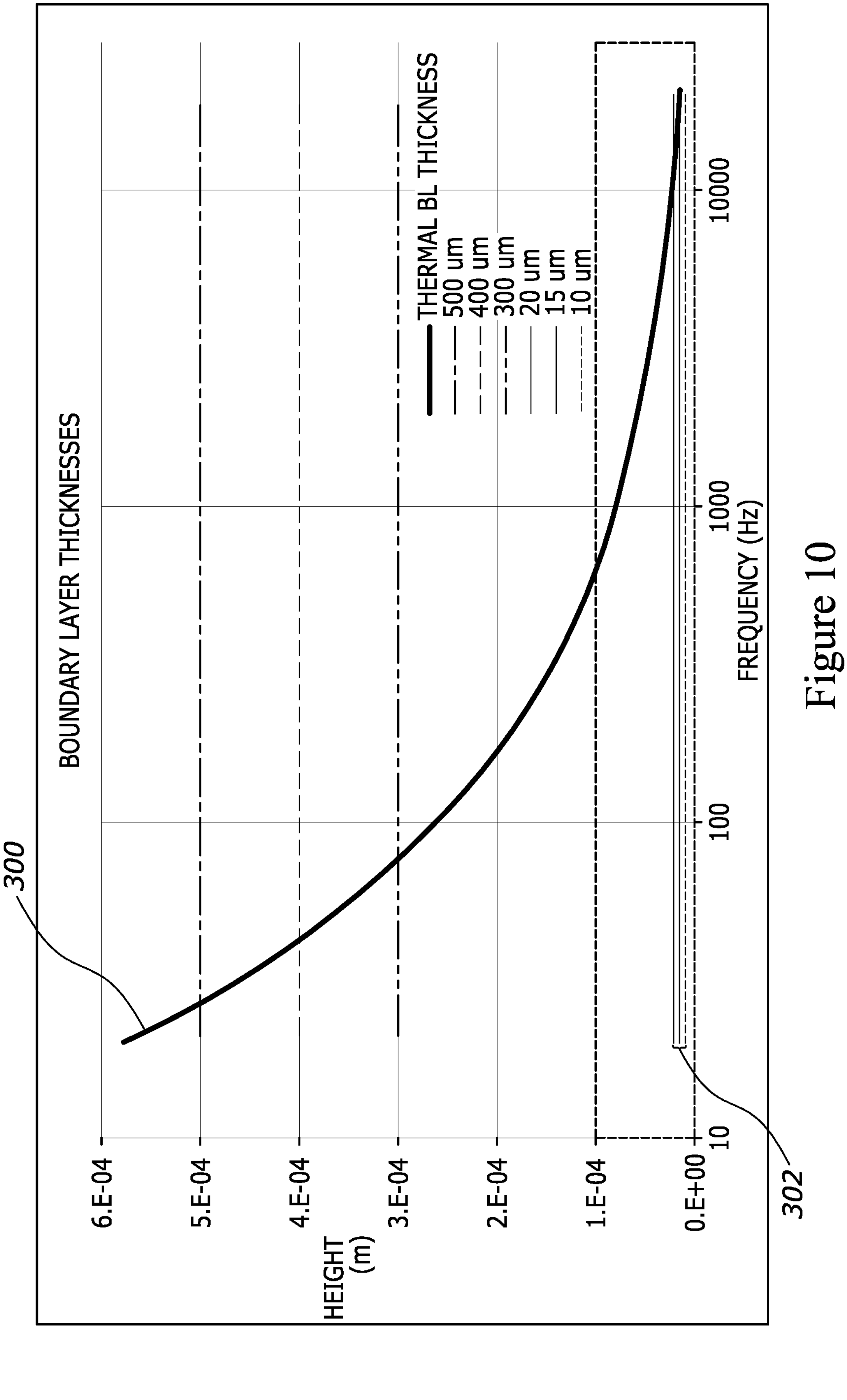
FIG. 10 is a graph showing the variation of thermal boundary layer thickness as a function of sound frequency, according to an illustrative embodiment.

FIG. 10 shows a plot of the relationship between the thermal boundary layer thickness 300 and the operating frequency of the MEMS transducer (e.g., the MEMS transducer modeled in FIG. 9, and assuming air is provided within the volume between the counter electrode and the diaphragm). The thermal boundary layer thickness 300 is shown to decrease with increasing operating frequency. This dependency is shown graphically in FIG. 10 over a range of operating frequencies within the audio frequency band of the MEMS acoustic transducer (e.g., within a human audible frequency range between approximately 20 Hz to 20 kHz).

As shown in FIG. 10, when the size of the gap (e.g., the height) between the counter electrode and the diaphragm is large (e.g., when the gap is greater than 500 μm), the thermal boundary layer thickness 300 is less than the size of the gap over a majority of the audio frequency band of the MEMS acoustic transducer. As the gap decreases, the thermal boundary layer thickness 300 becomes equal to or greater than the size of the gap over a larger proportion of the audio frequency band. It is within this range of gap sizes that the thermal-acoustic noise contribution is greatest and the overall SNR of the MEMS acoustic transducer is reduced (e.g., the sub-miniature MEMS transducer).

The approximate range of gap sizes that correspond with improved SNR performance (e.g., corresponding with back volumes from FIG. 9 for which the reversal in the trend of acoustic noise is observed) is identified by horizontal lines 302 toward the bottom of FIG. 10. As shown, the size of the gap (e.g., height 118 shown in FIG. 6) is less than approximately two times the boundary layer thickness 300 within the back volume 103 over a majority of the audio frequency band of the sub-miniature MEMS transducer 100 (e.g., between 20 Hz and 20 kHz). In other words, the back volume 103 is dimensioned such that the distance between any point or location within the back volume 103 and the nearest solid surface contacting the back volume 103 is less than a single thermal boundary layer thickness 300. For example, as shown in FIG. 6, a point 119 approximately half way in between the diaphragm 106 and the insulator 114 is spaced less than one thermal boundary layer thickness 300 from a back volume facing surface of both the diaphragm 106 and the insulator 114 (the solid surfaces of the back volume that are closest to point 119).

Based on this data (and data from FIG. 9), two different thermal regimes and mechanisms appear to exist depending on whether the size of the gap (e.g., the height 118) is 1) greater than two times the thermal boundary layer thickness over the majority of the audio frequency band or 2) less than two times the thermal boundary layer thickness over the majority of the audio frequency band. The fact that acoustic noise decreases at very small gap heights (less than two orders of magnitude less than most existing microphone assemblies) is an unforeseen benefit that has not been previously identified.

Figure 11:
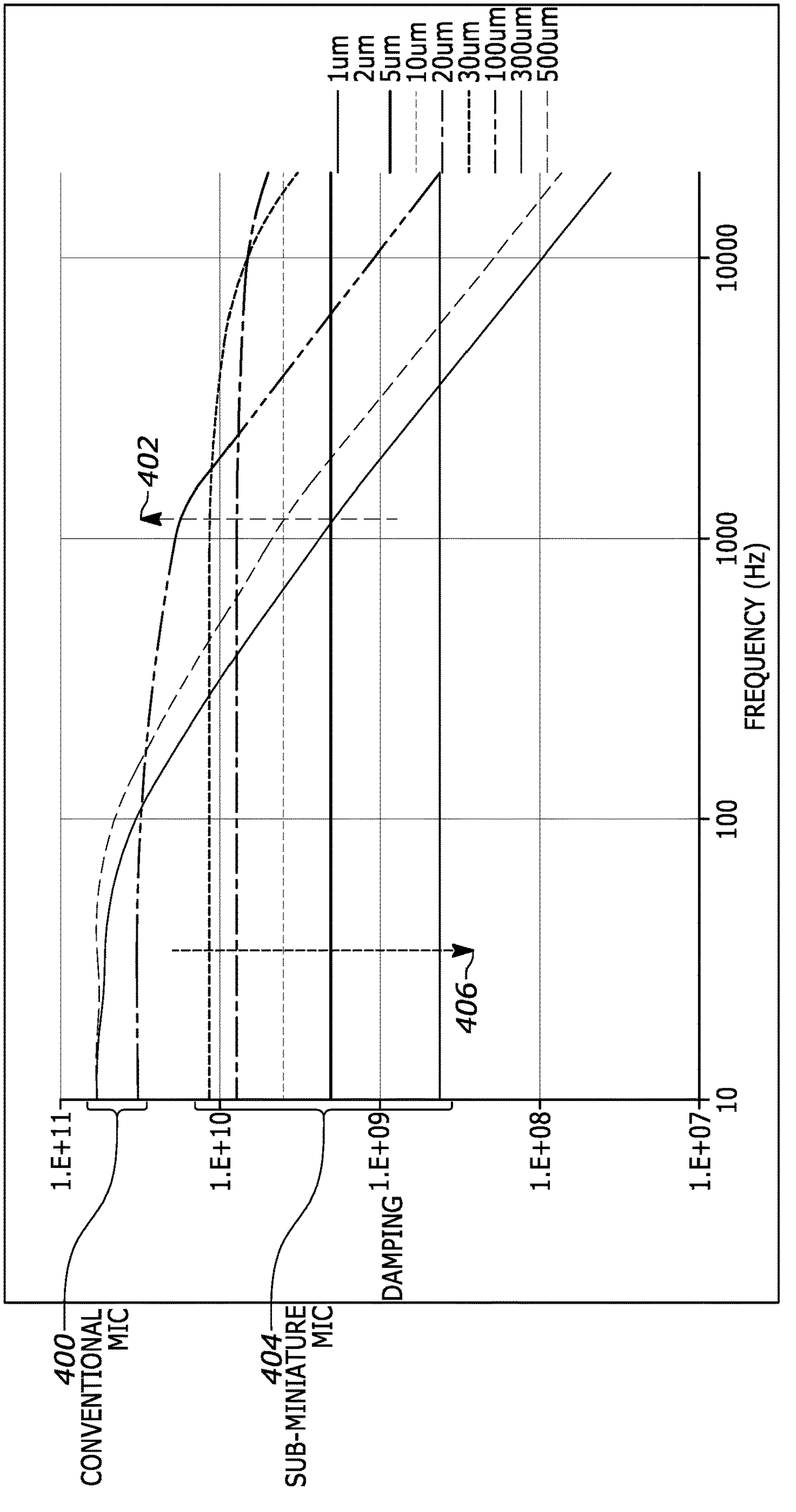
FIG. 11 is a graph showing the acoustic damping as a function of frequency of both a microphone assembly and a sub-miniature microphone assembly as a function of gap height within a MEMS acoustic transducer, according to an illustrative embodiment.

FIG. 11 shows the back volume damping (hereafter "damping") as a function of frequency of a MEMS acoustic transducer operating within these two different thermal regimes. The upper set of curves 400 show the damping for MEMS transducers having a gap size that is greater than the thermal boundary layer thickness. The direction of decreasing gap size for the curves 400 is indicated by dashed arrow 402. As shown in FIG. 11, as the size of the gap decreases, the damping (and related thermal noise) increases (e.g., the total noise over the audio frequency band of the MEMS transducer increases). The lower set of curves 404 show the damping response for sub-miniature MEMS transducers where the size of the gap is less than the thermal boundary layer thickness (e.g., less than two times the thermal boundary layer thickness, similar to the sub-miniature MEMS transducer 100 of FIGS. 5-6). The direction of decreasing gap size for the curves 404 in FIG. 11 is indicated by dashed arrow 406. The damping (and related thermal noise) is shown to decrease as the size of the gap decreases. Additionally, unlike the trend exhibited by the upper set of curves 400, the lower set of curves 404 exhibits an approximately flat damping response as a function of frequency. Such properties may be particularly advantageous for applications such as beam forming for signal processing, and other applications where the sensitivity of the MEMS transducer is reduced at low frequencies.

Figure 12:
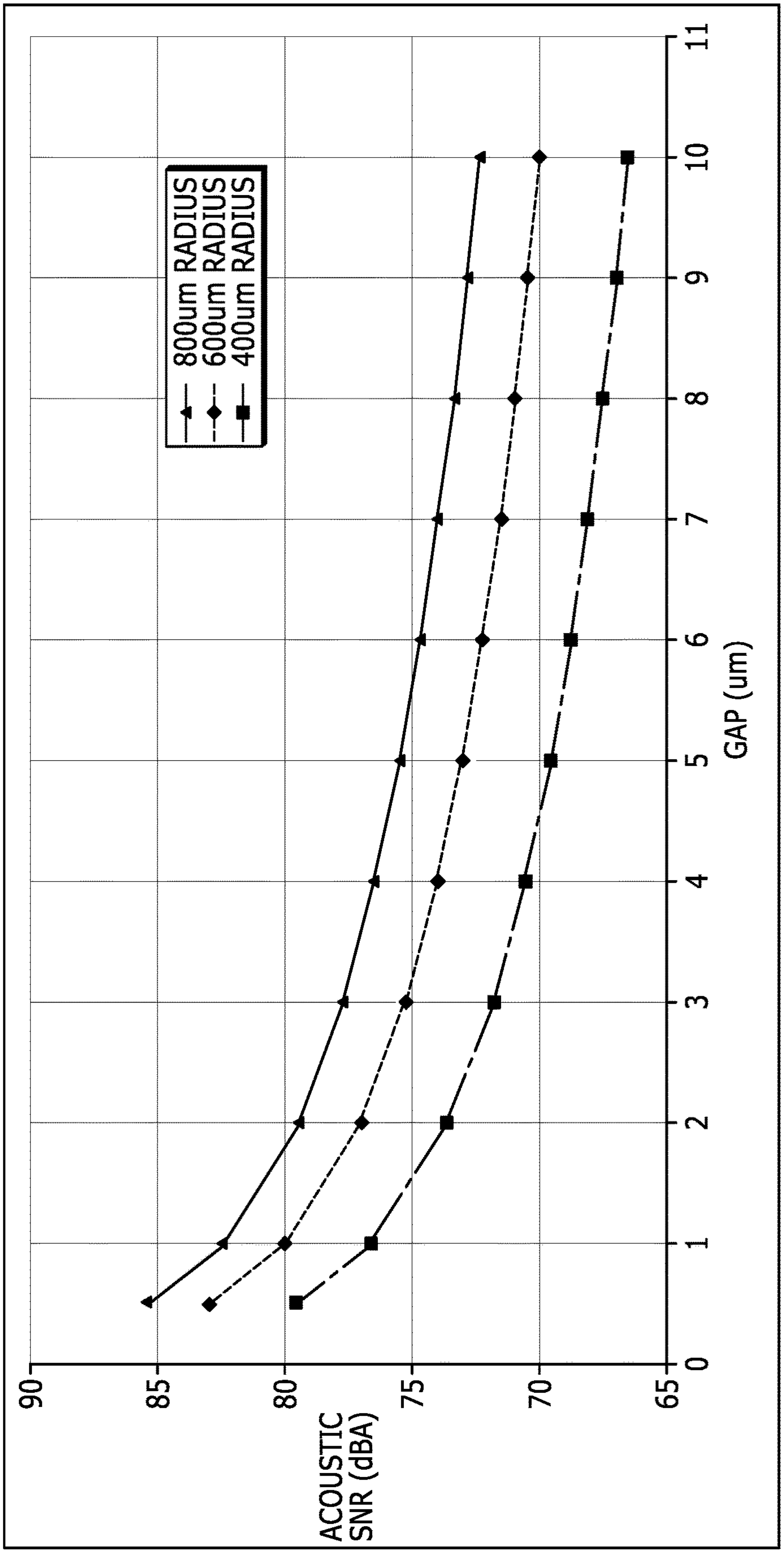
FIG. 12 is a graph of acoustic SNR as a function of gap height within a MEMS acoustic transducer, according to an illustrative embodiment.

FIG. 12 shows the acoustic SNR as a function of the gap size for three different values of the surface area of the diaphragm (e.g., the diameter of the diaphragm, and correspondingly, the diameter of the back volume) for a sub-miniature microphone assembly. Curves of acoustic SNR are provided over a range of different surface areas for the counter electrode and the diaphragm. The acoustic SNR is shown to increase with decreasing gap. The acoustic SNR is shown to decrease with decreasing surface area. Although the trend in SNR with surface area is opposite to the trend in SNR with the size of the gap (e.g., the height between the counter electrode and the diaphragm), the effect of the gap has been observed to dominate.

The results shown in FIGS. 9-12 were simulated assuming piston-like diaphragm displacement (e.g., assuming that the diaphragm does not curve or bow, and that all points along the surface of the diaphragm move by an equal amount). In reality, the diaphragm 106 (see FIG. 5) will not displace uniformly in a piston-like motion but will instead bow or curve under the bias voltage applied to the sub-miniature MEMS transducer 100 (and further as a result of sound pressure incident on the diaphragm 106). The movement of the diaphragm 106 will therefore move the air within the gap in both an axial direction (e.g., vertically up and down as shown in FIG. 5) and a radial direction (e.g., horizontally left and right as shown in FIG. 5). The radial velocity component of air within the back volume 103 will result in viscous losses, which will increase acoustic noise for the sub-miniature MEMS transducer above the values shown in FIG. 12.

Figure 13:
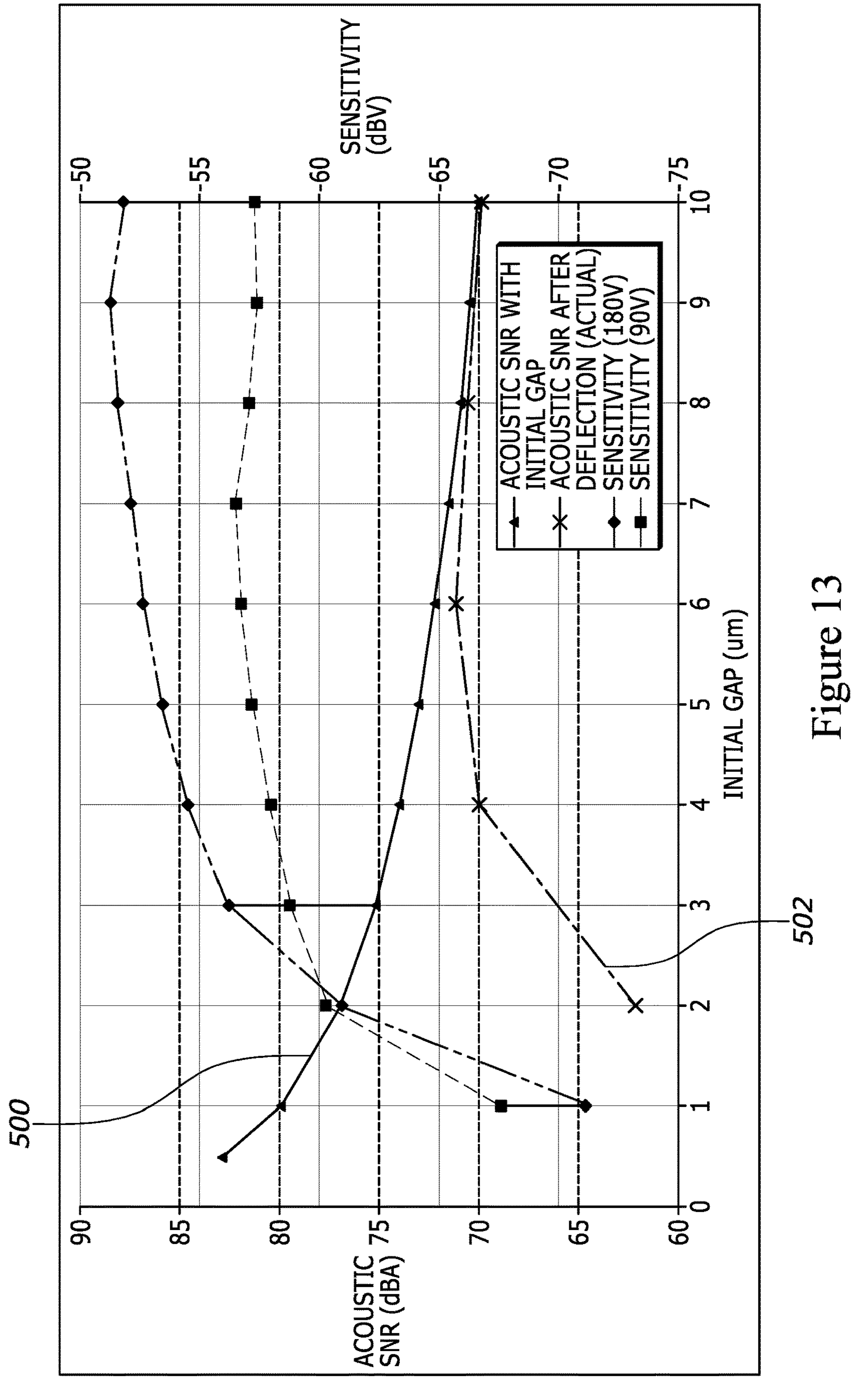
FIG. 13 is a graph of acoustic SNR and sensitivity as a function of gap height within a sub-miniature MEMS acoustic transducer, according to an illustrative embodiment.

FIG. 13 shows a plot of the acoustic SNR as a function of the size of the gap between the counter electrode and the diaphragm (the vertical spacing between the counter electrode and the diaphragm). Curve 500 shows the acoustic SNR for a sub-miniature MEMS transducer that is modeled assuming a piston-like diaphragm motion. Curve 502 shows the acoustic SNR for a sub-miniature MEMS transducer that is modeled assuming that the diaphragm bends (e.g., curves) with the application of a bias voltage to the sub-miniature MEMS transducer. As shown in FIG. 13, the effect of actual diaphragm bending and movement is most prominent at small gap sizes (e.g., below 5 μm in this case). At gap sizes between 5 μm and 11 μm, viscous effects associated with diaphragm movement are significantly reduced. One way to counteract the effects of diaphragm displacement/movement, as shown in FIG. 13, is to constrain the size of the gap to within a range between approximately 5 μm and 12 μm, or another suitable range depending on the geometry of the back volume. Alternatively, or in combination, the bias voltage of the sub-miniature MEMS transducer may be adjusted (e.g., increased) to increase the sensitivity of the microphone assembly to at least partially offset the effects of the additional acoustic noise resulting from viscous losses.

Figure 14:
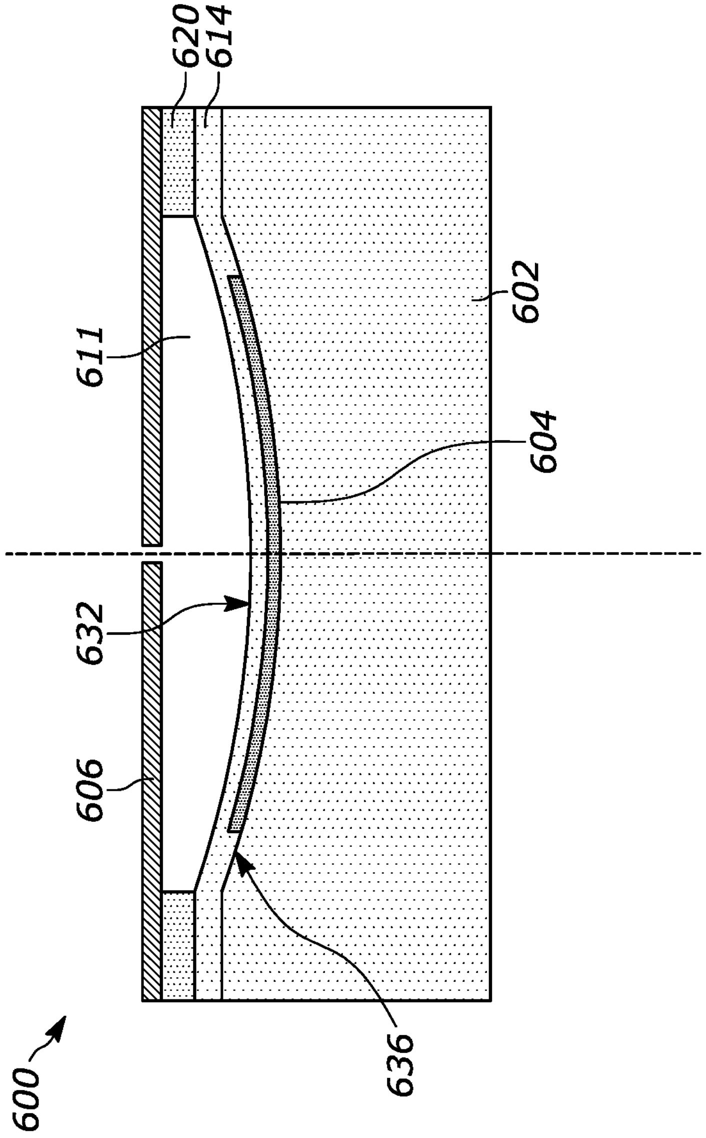
FIG. 14 is a side cross-sectional view of a sub-miniature MEMS acoustic transducer, according to another illustrative embodiment.

The geometry of the counter electrode may also be adjusted to reduce the radial velocity component of air within the back volume resulting from non-piston-like diaphragm movement. For example, FIG. 14 shows a MEMS transducer 600 that includes a curved counter electrode 604. In particular, an upper surface 632 (e.g., first surface, back volume facing surface, etc.) of the counter electrode 604 is shaped to approximately match the curvature of the diaphragm 606 under application of a bias voltage such that, during operation, the distance between the diaphragm 606 and the counter electrode 604 is approximately equal throughout the back volume 611 (e.g., in a lateral direction, away from a central axis of the MEMS transducer). To achieve this, the counter electrode 604 and the diaphragm 606 are not parallel in a resting situation (e.g., when the bias voltage is removed). As shown in FIG. 14, the counter electrode 604 is deposited or otherwise formed onto a recessed portion 636 of a transducer substrate 602 for the sub-miniature MEMS transducer 600. The curvature of the counter electrode 604 is a function of the bias voltage applied to the sub-miniature MEMS transducer 600, the dimensions of the back volume 611, and the thickness of the diaphragm 606.

Returning to FIG. 6, the sub-miniature MEMS transducer 100 is shown to include an opening or pierce 138 that extends through the diaphragm 106 (e.g., from the first side 132 of the diaphragm 106 to the second side 134 of the diaphragm 106). The pierce 138 is disposed at a central position on the diaphragm 106 in coaxial arrangement relative to the central axis 128 of the sub-miniature MEMS transducer 100. The pierce 138 is a circular through-hole in the diaphragm 106. In other embodiments, the size, shape, location, and or number of openings in the diaphragm 106 may be different.

Figure 15:
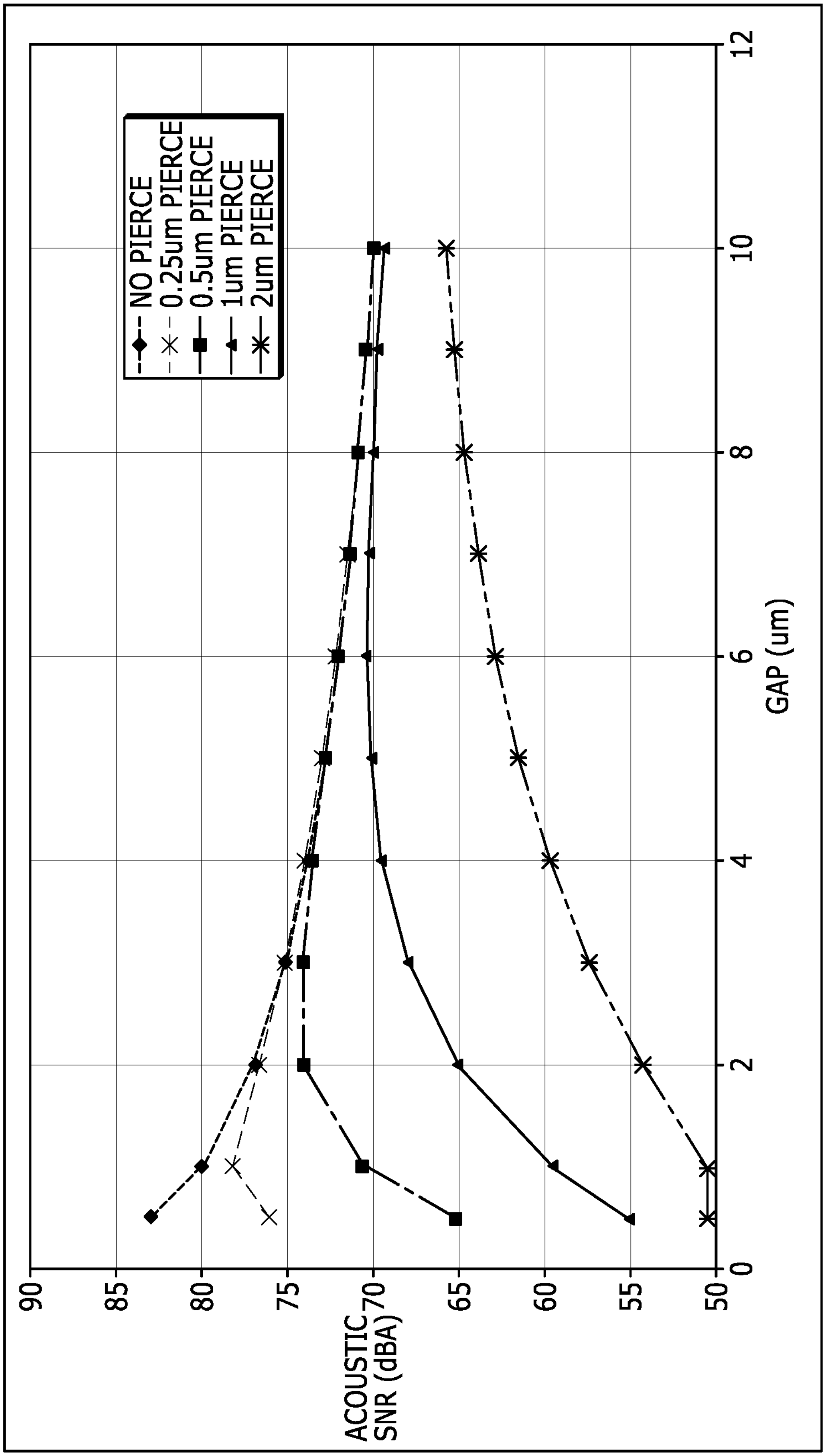
FIG. 15 is a graph of acoustic SNR as a function of gap height within a sub-miniature MEMS acoustic transducer over a range of different diaphragm pierce diameters for the sub-miniature MEMS acoustic transducer, according to an illustrative embodiment.

FIG. 15 shows the acoustic SNR as a function of the size of the gap for a range of different pierce 138 diameters. As shown in FIG. 15, the pierce 138 introduces acoustic noise into the sub-miniature MEMS transducer 100 (see also FIG. 5), particularly at small gap sizes (e.g., below 5 μm). The rate of change (e.g., increase) of the acoustic noise also increases with the diameter of the pierce 138. In the sub-miniature MEMS transducer 100 of FIG. 5, the diameter 140 of the pierce 138 is within a range between approximately 0.25 μm and 2 μm to minimize the effects of the pierce 138 on the overall acoustic SNR. It should be appreciated that the optimal range of pierce 138 diameters will vary depending on the thickness of the diaphragm 106 and the geometry of the back volume 103.

Figure 16:
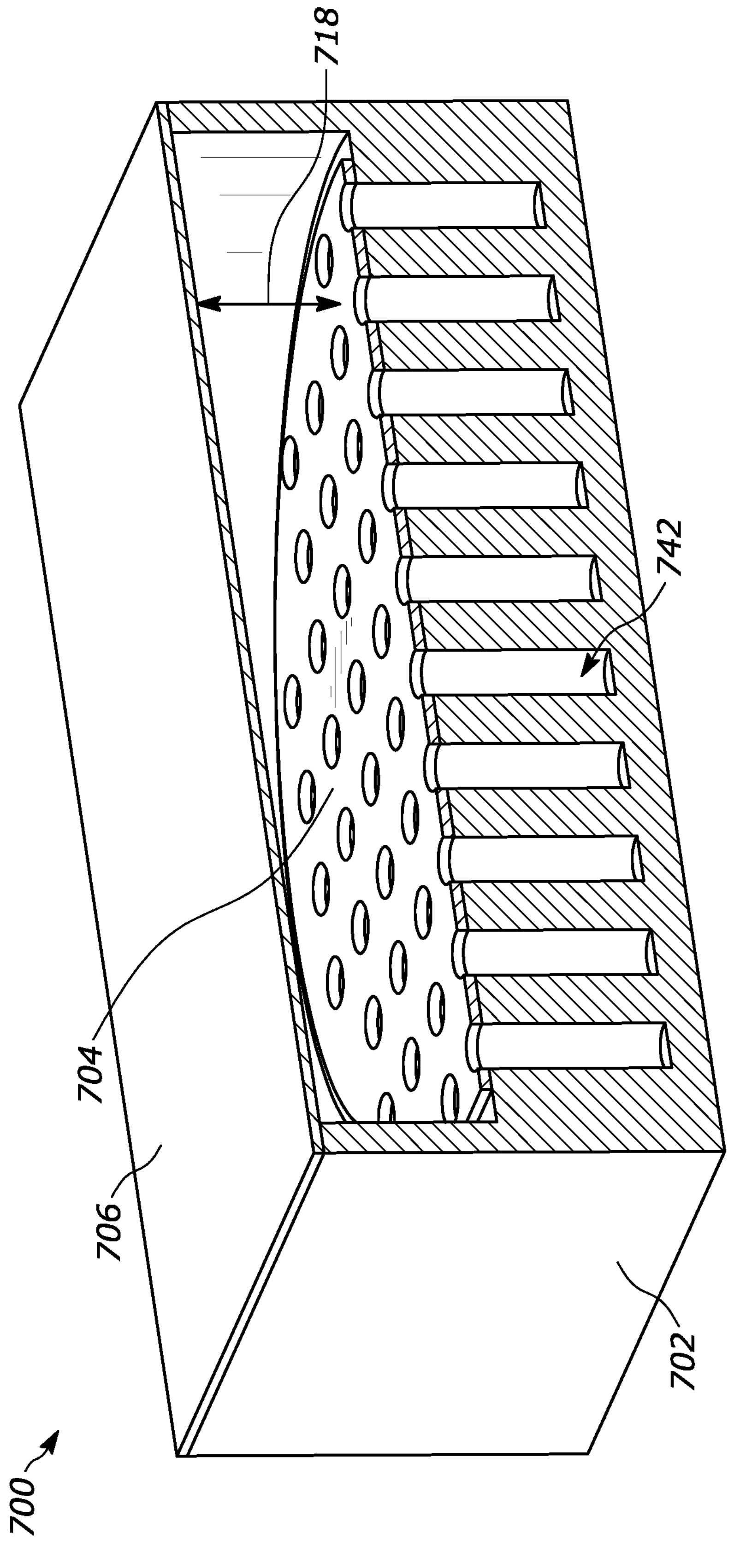
FIG. 16 is a perspective and sectional view of a sub-miniature MEMS acoustic transducer, according to another illustrative embodiment.
Figure 17:
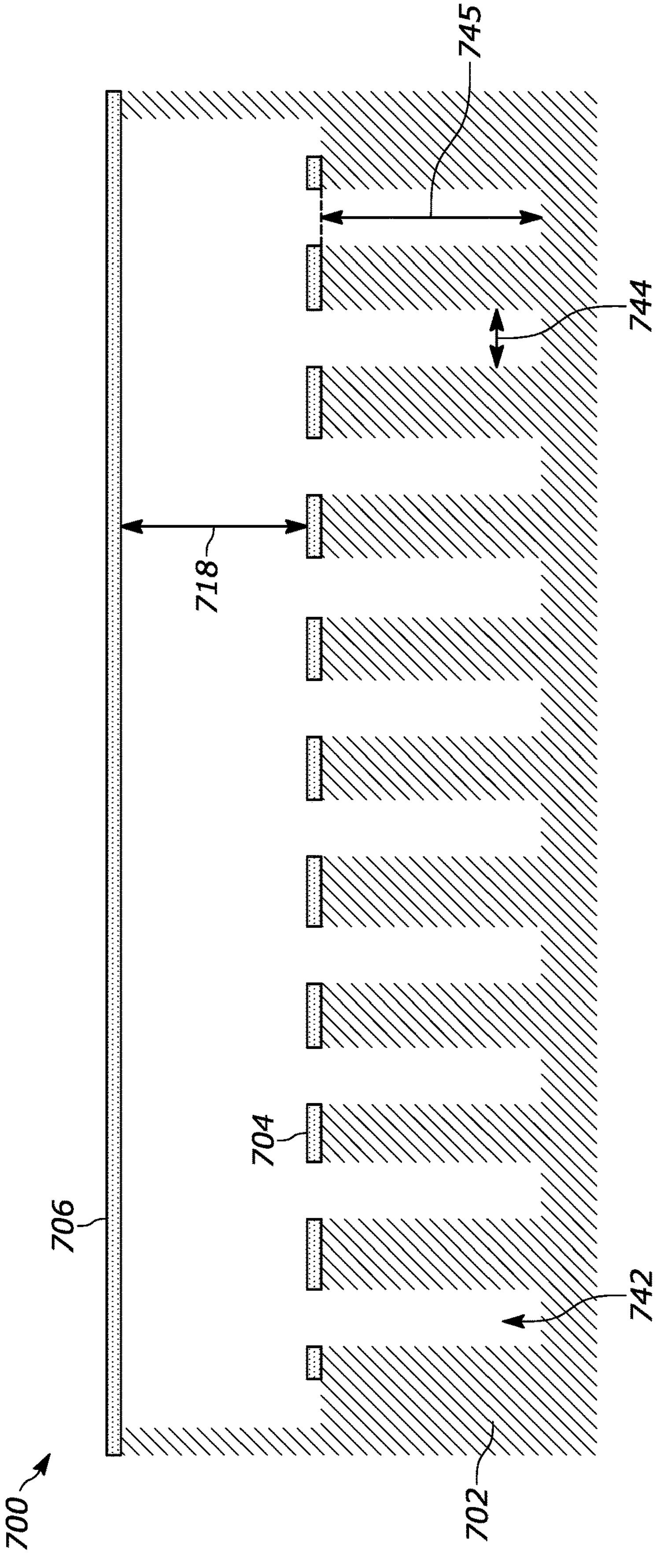
FIG. 17 is a side cross-sectional view of the sub-miniature MEMS acoustic transducer of FIG. 16.

The sensitivity of the sub-miniature MEMS transducer 100 may also be improved by increasing the compliance of air in the back volume 103 (e.g., by reducing the stiffness of the air contained within the back volume 10). Referring to FIGS. 16-17, a sub-miniature MEMS transducer 700 is shown to include a counter electrode 704 and a transducer substrate 702 that includes a plurality of channels 742 formed into the counter electrode 704 and transducer substrate 702. More specifically, the sub-miniature MEMS transducer 700 is structured with the channels 742 formed with dimensions such that any point within the channels 742 is less than a single thermal boundary layer thickness from a nearest boundary surface. In the embodiment of FIG. 16, each one of the plurality of channels 742 extends away from the diaphragm 706 in a substantially perpendicular orientation relative to the diaphragm 706 (e.g., parallel to a central axis of the sub-miniature MEMS transducer 700). The channels 742 extend through the counter electrode 704. Among other benefits, the channels 742 increase the overall compliance of air within the sub-miniature MEMS transducer 700 (e.g., by adding air volume away from the space between the counter electrode 704 and the diaphragm 706) without fully penetrating through the transducer substrate 702.

The channels 742 in the transducer substrate 702 are sized to reduce thermal-acoustic noise within the sub-miniature MEMS transducer 700. Specifically, a width 744 (e.g., diameter) of each one of the plurality of channels 742 is less than two times the thermal boundary layer thickness within the back volume over a majority of an audio frequency band of the sub-miniature MEMS transducer 700, such that the distance between any point or location within the back volume is within a single thermal boundary layer thickness from a nearest solid surface of the transducer substrate or the diaphragm over a majority of the audio frequency band. The depth 745 of each of the channels 742 is approximately equal to the size of the gap, shown as height 718 (e.g., the distance between the counter electrode 704 and the diaphragm 706). It will be appreciated that the geometry of the channels 742 may be different in various illustrative embodiments. For instance, in other embodiments the depth 745 may be different from the size of the gap.

Figure 18:
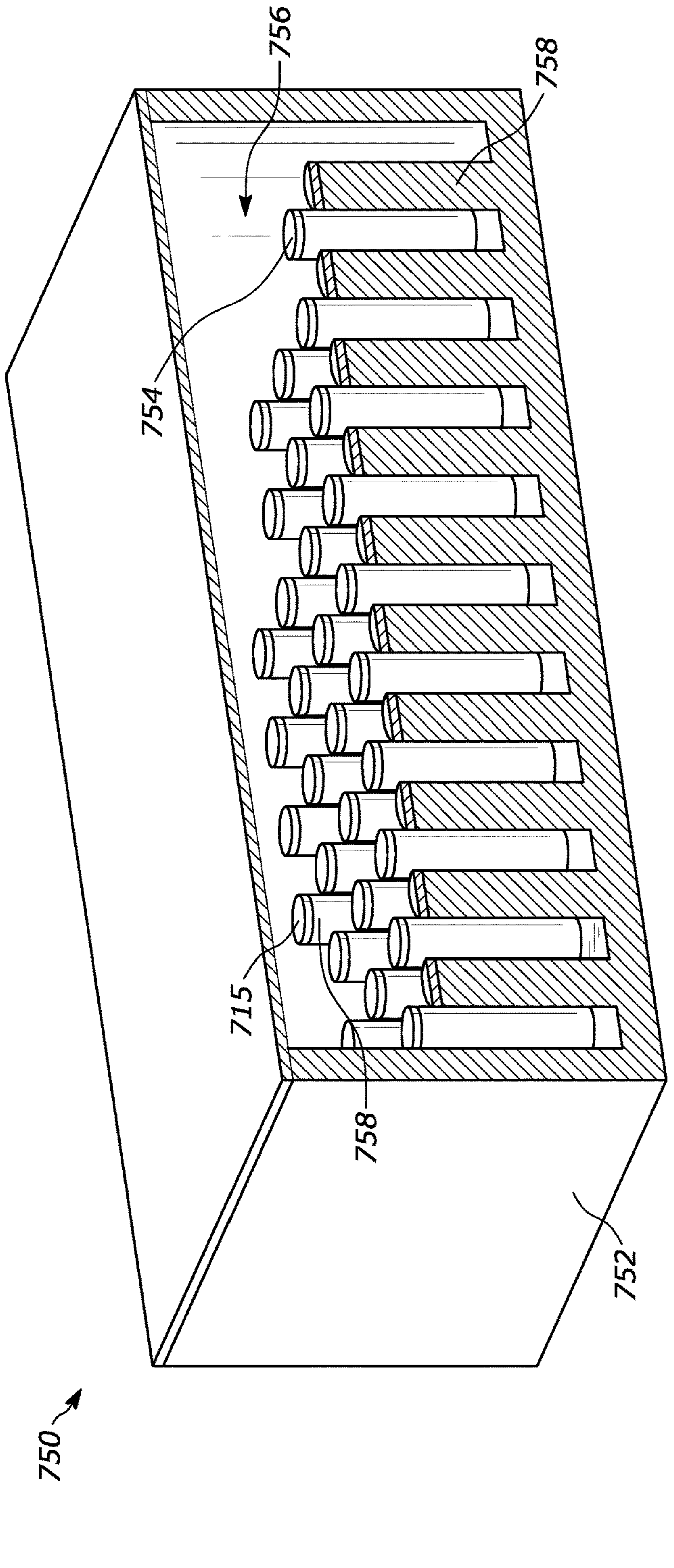
FIG. 18 is a perspective and sectional view of a sub-miniature MEMS acoustic transducer, according to another illustrative embodiment.

Referring to FIG. 18, a sub-miniature MEMS transducer 750 is shown to include a counter electrode 754 and a transducer substrate 752 forming a cavity 756 (e.g., back volume) in which a plurality of pillars 758 are disposed. The pillars 758 are cylinders that extend upwardly from a lower surface of the cavity 756 in a substantially perpendicular orientation relative to the lower surface (the pillars 758 extend toward the diaphragm 706). In other embodiments, the shape of the pillars 758 may be different. The pillars 758 may be formed into a transducer substrate 752 for the sub-miniature MEMS transducer 750. An electrode 715 is deposited onto or otherwise connected to an upper surface of each one of the pillars 758. Together, the electrodes 715 form a counter electrode for the sub-miniature MEMS transducer 750. A lateral distance between adjacent pillars 758 (e.g., a radial distance relative to a central axis of each of the pillars 758) is less than two times the thermal boundary layer thickness over a majority of an audio frequency band of the sub-miniature MEMS transducer 750.

In other embodiments, the geometry of the channels (FIG. 16-17) or pillars (FIG. 18) may be different. In some embodiments, a porous silicon transducer substrate may be used in lieu of channels or pillars. Among other benefits, using a porous silicon transducer substrate increases the effective compliance of the air within the back volume, without requiring additional manufacturing operations to form channels, pillars, or other geometry into the transducer substrate.

Figure 19:
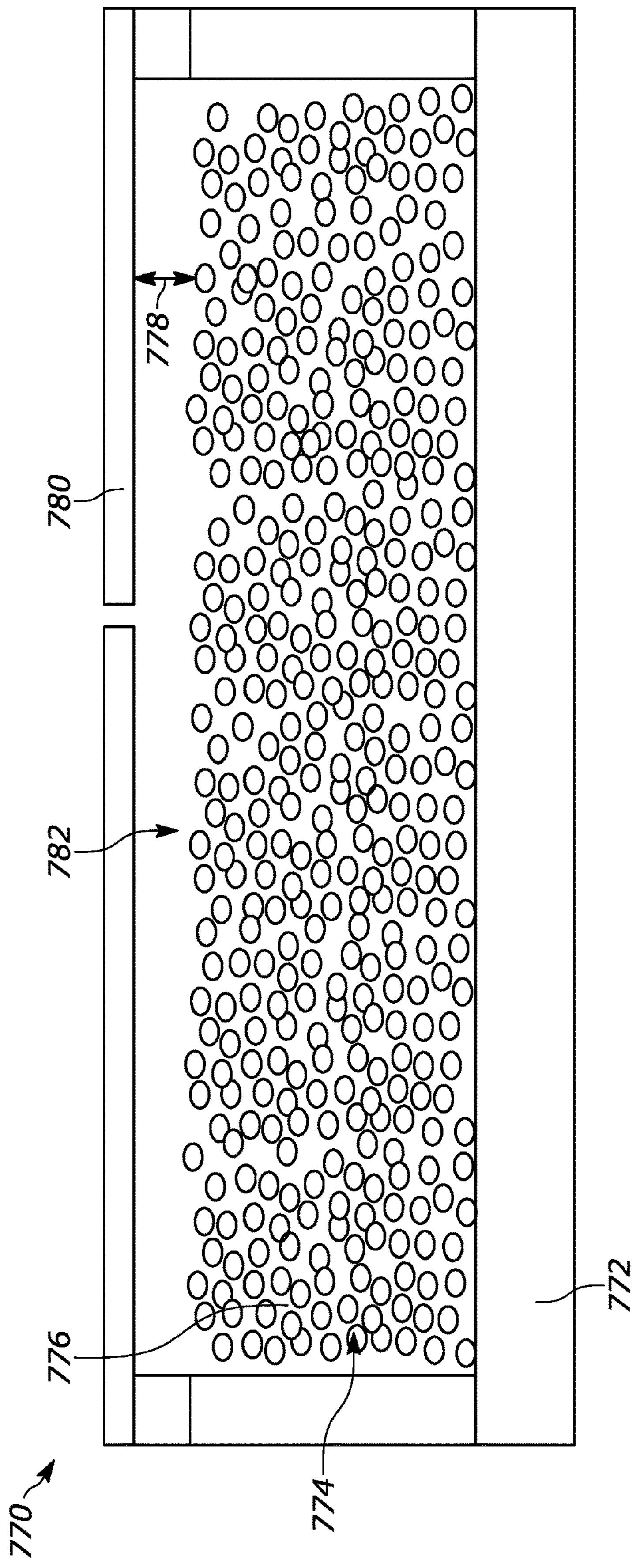
FIG. 19 is a side cross-sectional view of a sub-miniature MEMS acoustic transducer, according to another illustrative embodiment.

The structuring of the substrate to increase back volume can be taken to the limit by forming a porous silicon region in the substrate as depicted for the sub-miniature MEMS transducer 770 in FIG. 19. Being formed of silicon, the substrate 772 can be doped to make it conductive so that the surface of the porous region 774 is effectively the counter electrode for a capacitive transducer. The size of the pores 776 is much less than a single thermal boundary layer thickness and yet allows air flow in all directions. The percentage of open volume in the porous region 774 can be controlled by well-known electrochemical processes and can be made fairly large. The gap size, shown as height 778, between the upper surface of the porous region 774 (e.g., the counter electrode) and the diaphragm 780 still must be less than two thermal boundary layer thicknesses, but in this embodiment the gap size does not dominate the size of the back volume 782 and thus the sensitivity of the sub-miniature MEMS transducer 770.

Figure 20:
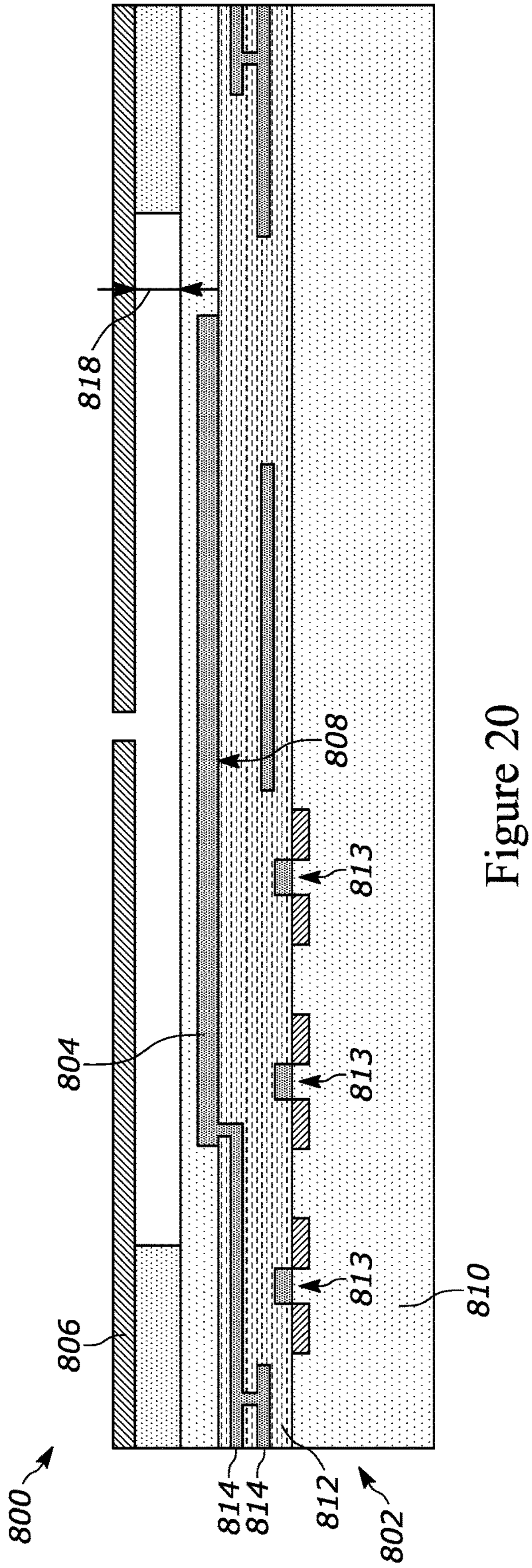
FIG. 20 is a side cross-sectional view of a sub-miniature MEMS acoustic transducer that is integrally formed onto an integrated circuit, according to an illustrative embodiment.

Among other benefits, the reduction in the required back volume of the sub-miniature MEMS transducer allows the overall footprint (e.g., package size, etc.) of the microphone assembly to be substantially reduced. Moreover, because the counter electrode is a solid, unperforated structure, the sub-miniature MEMS transducer may be integrated with other components of the microphone assembly to further reduce the package size of the microphone assembly. For example, FIG. 20 shows monolithic integration of a sub-miniature MEMS transducer 800 with an integrated circuit (IC) 802. The IC 802 may be an application specific integrated circuit (ASIC). Alternatively, the IC 802 may include another type of semiconductor die integrating various analog, analog-to-digital, and/or digital circuits. As shown in FIG. 20, the IC 802 forms a transducer substrate for the sub-miniature MEMS transducer 800. The sub-miniature MEMS transducer 800 is integrally formed on the IC 802 as a single unitary structure. A counter electrode 804 of the sub-miniature MEMS transducer 800 is directly coupled to IC 802 along an entire lower surface 808 of the counter electrode 804.

The geometry of the counter electrode 804 may be the same or similar to the geometry of the counter electrode 104 described with reference to FIG. 5. As shown in FIG. 20, the counter electrode 804 is directly coupled to the IC 802 (e.g., formed onto an upper surface of the IC 802). The IC 802 includes an IC substrate 810 and an upper portion 812 coupled to a first surface (e.g., an upper surface, etc.) of the IC substrate 810. The IC 802 additionally includes a plurality of transistors 813 embedded in the upper surface of the IC substrate 810, between the IC substrate 810 and the upper portion 812. The upper portion 812 is structured to electrically couple (e.g., connect, etc.) the counter electrode 804 to the IC 802 and/or to other parts of the microphone assembly (not shown). In particular, the upper portion 812 includes a plurality of metal layers 814 embedded within the upper portion 812. The metal layers 814 electrically connect the counter electrode 804 to a contact disposed at an outer surface of the upper portion 812 (e.g., to an outer surface of the combined sub-miniature MEMS transducer 800 and IC 802 die).

Figure 21:
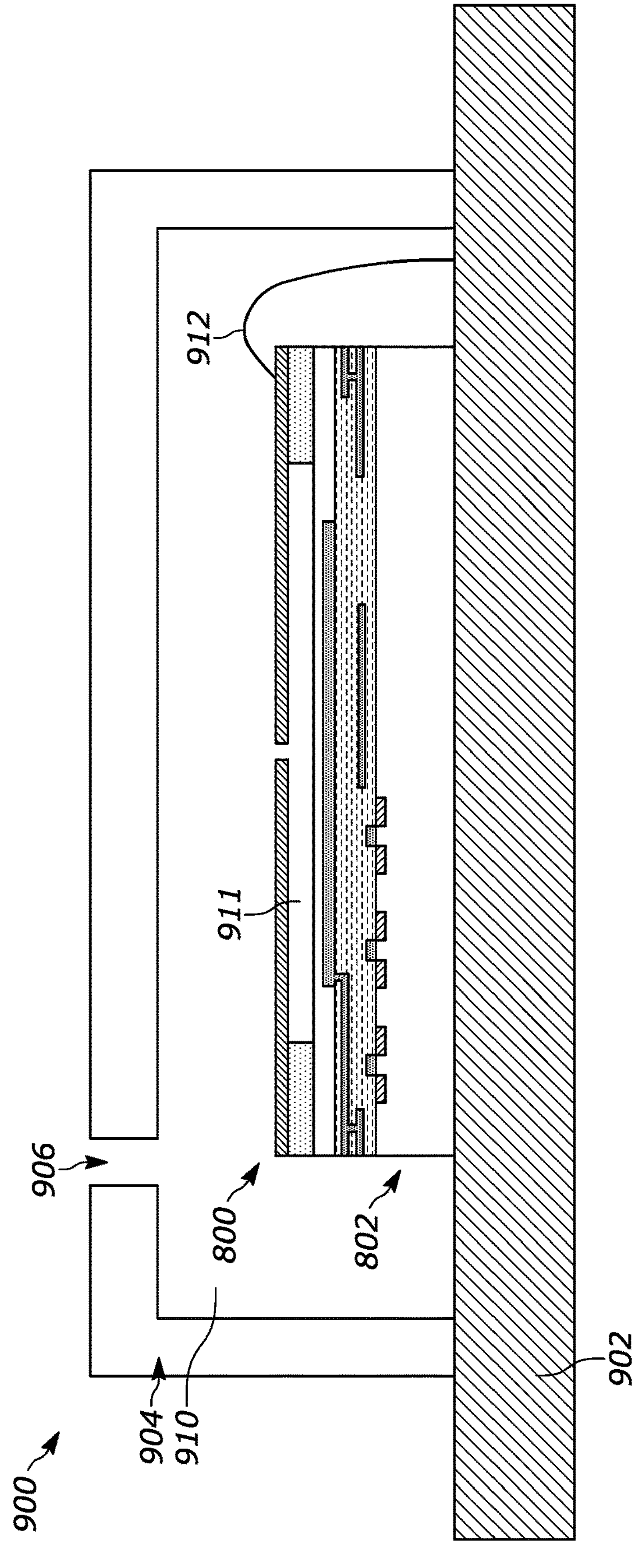
FIG. 21 is a side cross-sectional view of a sub-miniature microphone assembly, according to an illustrative embodiment.

According to an illustrative embodiment, as shown in FIG. 21, the combined sub-miniature MEMS transducer 800 and IC 802 die is configured to fit within a sub-miniature microphone assembly, shown as assembly 900. As shown in FIG. 21, the assembly 900 includes a housing including a microphone base 902, a cover 904 (e.g., a housing lid), and a sound port 906. In some embodiments, the microphone base 902 is a printed circuit board. The cover 904 is coupled to the microphone base 902 (e.g., the cover 904 may be mounted onto a peripheral edge of the microphone base 902). Together, the cover 904 and the microphone base 902 form an enclosed volume for the assembly 900 (e.g., a front volume 910 of the sub-miniature MEMS transducer 800). As shown in FIG. 21, the sound port 906 is disposed on the cover 904 and is structured to convey sound waves to the sub-miniature MEMS transducer 800 located within the enclosed volume. Alternatively, the sound port 906 may be disposed on the microphone base 902. The sound waves (e.g., sound pressure, etc.) move the diaphragm 806 of the sub-miniature MEMS transducer 800, which changes the size of the gap (e.g., the height 818) between the diaphragm 806 and the counter electrode 804. The volume between the counter electrode 804 and the diaphragm 806 forms an entire back volume 911 for the sub-miniature MEMS transducer 800, which, advantageously, reduces the overall footprint of the sub-miniature microphone assembly 900, without limiting the acoustic SNR that can be achieved.

As shown in FIG. 21, the IC substrate 810 is coupled to the microphone base 902, to a first surface of the microphone base 902 within the enclosed volume 908. In some embodiments, the assembly may form part of a compact computing device (e.g., a portable communication device, a smartphone, a smart speaker, an internet of things (IoT) device, etc.), where one, two, three or more assemblies may be integrated for picking-up and processing various types of acoustic signals such as speech and music.

In the embodiment of FIG. 21, the MEMS transducer 800 is configured to generate an electrical signal (e.g., a voltage) at a transducer output in response to acoustic activity incident on the sound port 906. As shown in FIG. 21, the transducer output includes a pad or terminal of sub-miniature MEMS transducer 800 that is electrically connected to the electrical circuit via one or more bonding wires 912. The assembly 900 may further include electrical contacts disposed on a surface of the microphone base 902 outside of the cover 904. The contacts may be electrically coupled to the electrical circuit (e.g. via bonding wires or electrical traces embedded within the microphone base 902) and may be configured to electrically connect the sub-miniature microphone assembly 900 to one of a variety of host devices.

Figure 22:
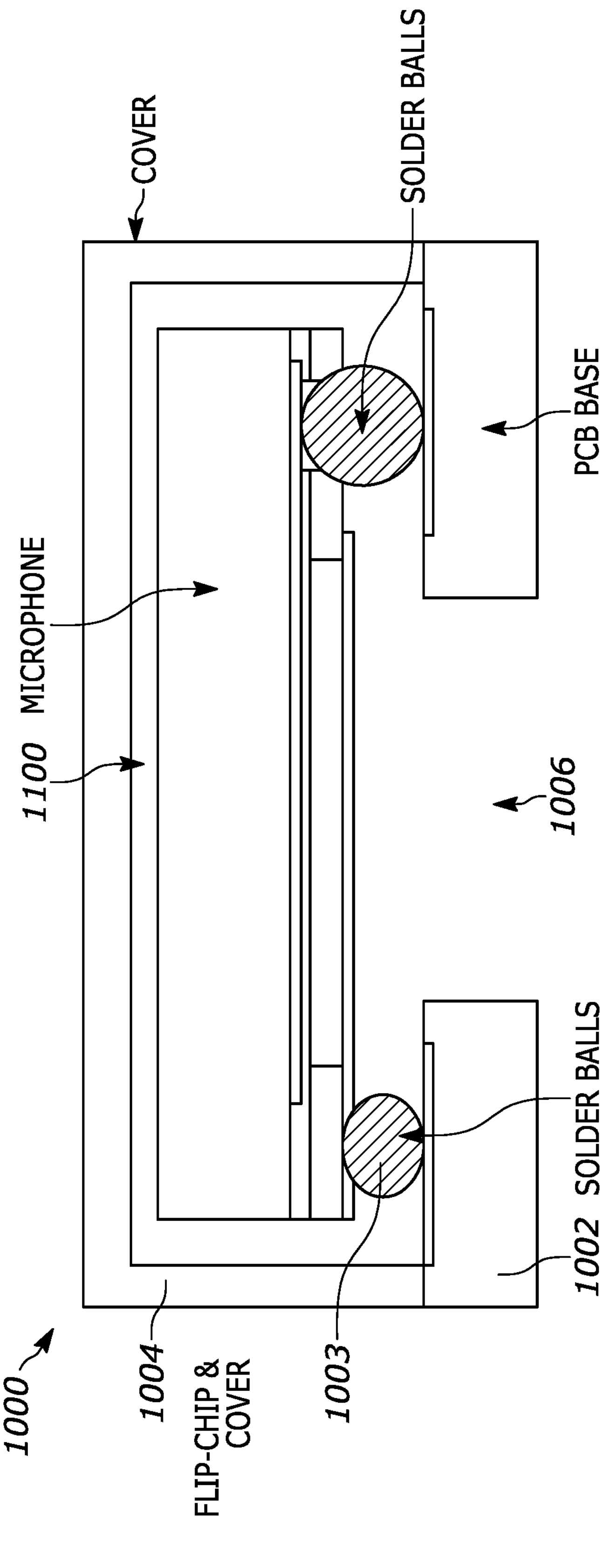
FIG. 22 is a side cross-sectional view of a sub-miniature microphone assembly, according to another illustrative embodiment.

The arrangement of components for the sub-miniature microphone assembly of FIG. 21 should not be considered limiting. Many alternatives are possible without departing from the inventive concepts disclosed herein. For example, FIG. 22 shows a sub-miniature microphone assembly 1000 that includes a sub-miniature MEMS transducer 1100 that is flip-chip bonded to a base 1002 of the sub-miniature microphone assembly 1000. The sub-miniature MEMS transducer 1100 is separated from the base 1002 (and electrically connected to the base 1002) by balls of solder 1003. The sub-miniature MEMS transducer 1100 is arranged to receive sound energy through a sound port 1006 disposed centrally within the base 1002. The sub-miniature MEMS transducer 1100 is suspended within a cavity formed between the base 1002 and a cover 1004 of the sub-miniature microphone assembly 1000.

Figure 23:
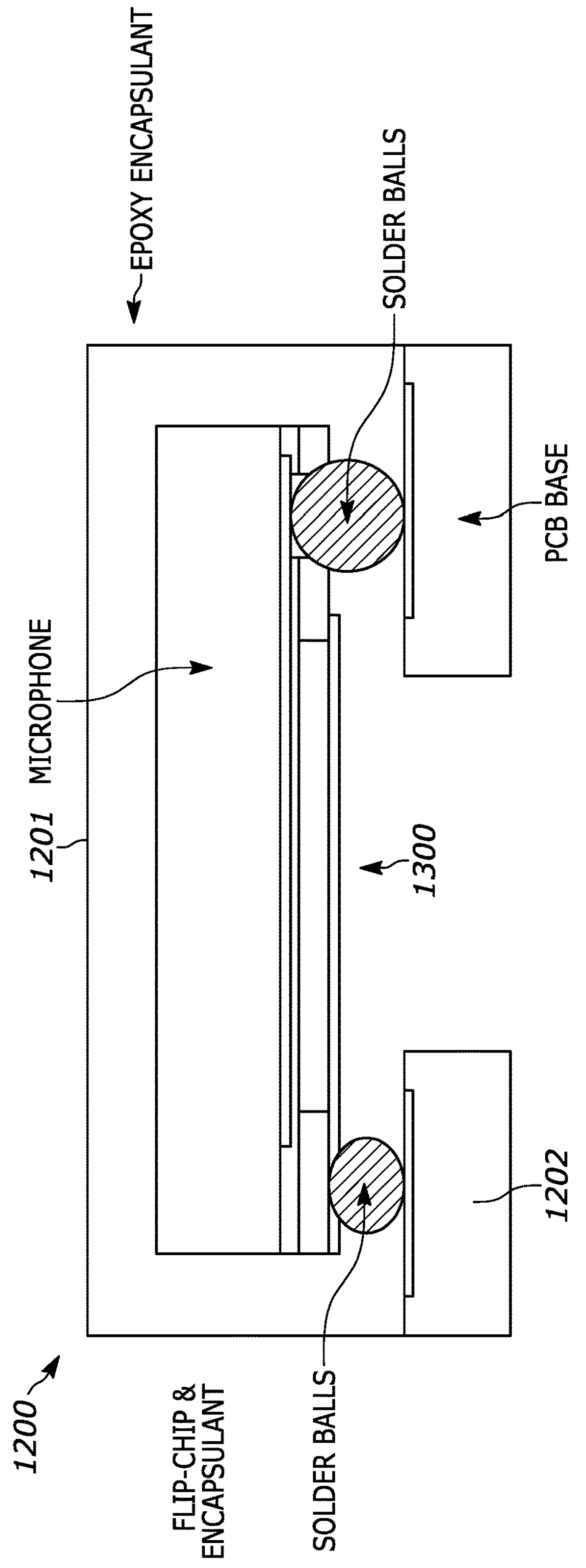
FIG. 23 is a side cross-sectional view of a sub-miniature microphone assembly, according to another illustrative embodiment.

FIG. 23 shows a sub-miniature microphone assembly 1200 that is similar to the sub-miniature microphone assembly 1000 of FIG. 22, but where the cover has been replaced by an encapsulant 1201 that surrounds the sub-miniature MEMS transducer 1300. Among other benefits, the encapsulant 1201 insulates the MEMS transducer 1300 and helps to support the sub-miniature MEMS transducer 1300 in position above the base 1202 of the sub-miniature microphone assembly 1200. The encapsulant may include a curable epoxy or any other suitable material.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A microphone assembly comprising:

a microelectromechanical systems (MEMS) transducer, comprising a transducer substrate, a diaphragm oriented substantially parallel to the transducer substrate and spaced apart from the transducer substrate to form a gap, and a counter electrode coupled to the transducer substrate, the counter electrode positioned between the diaphragm and the transducer substrate, wherein the MEMS transducer generates a signal representative of a change in capacitance between the counter electrode and the diaphragm, and wherein a back volume of the MEMS transducer is an enclosed volume positioned between the transducer substrate and the diaphragm; and an integrated circuit that receives the signal, wherein every point within the back volume is a distance less than a thermal boundary layer thickness from a nearest solid surface at an upper limit of an audio frequency band that the integrated circuit is monitoring.

2. The microphone assembly of claim 1, wherein the counter electrode is connected to an upper surface of the transducer substrate.

3. The microphone assembly of claim 1, wherein the counter electrode is embedded within the transducer substrate.

4. The microphone assembly of claim 1, wherein the counter electrode is polycrystalline silicon.

5. The microphone assembly of claim 1, wherein the upper limit of the audio frequency band is 20 kHz.

6. The microphone assembly of claim 1, wherein the enclosed volume forms the entire back volume of the MEMS transducer.

7. The microphone assembly of claim 1, wherein the transducer substrate comprises a plurality of channels penetrating an upper surface of the transducer substrate and extending away from the diaphragm, wherein the channels are part of the back volume.

8. The microphone assembly of claim 1, wherein the transducer substrate comprises a cavity penetrating an upper surface of the transducer substrate and extending away from the diaphragm, in which a plurality of pillars is disposed, and wherein the cavity is part of the back volume.

9. The microphone assembly of claim 1, wherein the integrated circuit monitors audio frequencies up to an upper limit of audible frequencies, and wherein every point within the back volume is a distance less than a thermal boundary layer thickness from a nearest solid surface at the upper limit of the audible frequencies.

* * * * *